(12) United States Patent
Sato et al.

(10) Patent No.: US 12,242,052 B2
(45) Date of Patent: Mar. 4, 2025

(54) LIGHT DEFLECTION DEVICE AND OPTICAL DEVICE

(71) Applicant: FUJIFILM Corporation, Tokyo (JP)

(72) Inventors: Hiroshi Sato, Minamiashigara (JP); Yukito Saitoh, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 485 days.

(21) Appl. No.: 17/681,057

(22) Filed: Feb. 25, 2022

(65) Prior Publication Data
US 2022/0179197 A1    Jun. 9, 2022

Related U.S. Application Data

(63) Continuation of application No. PCT/JP2020/032727, filed on Aug. 28, 2020.

(30) Foreign Application Priority Data

Aug. 29, 2019    (JP) .................. 2019-156724

(51) Int. Cl.
*G02B 26/10* (2006.01)
*G02B 27/42* (2006.01)
(Continued)

(52) U.S. Cl.
CPC ............ *G02B 26/10* (2013.01); *G02B 27/42* (2013.01); *G02F 1/13* (2013.01); *G02F 1/29* (2013.01); *G02F 2203/24* (2013.01)

(58) Field of Classification Search
CPC .... G02B 26/10; G02B 27/42; G02B 26/0808; G02B 5/3016; G02B 5/18; G02B 5/30;
(Continued)

(56) References Cited

U.S. PATENT DOCUMENTS 5,815,233 A * 9/1998 Morokawa ............. G02F 1/29
349/200
7,969,558 B2    8/2011 Hall
(Continued)

FOREIGN PATENT DOCUMENTS

JP    2000-75229 A    3/2000
JP    2005-18040 A    1/2005
(Continued)

OTHER PUBLICATIONS

English Machine Translation of Tsuda et al JP 2019045574 (Year: 2024).*
(Continued)

*Primary Examiner* — Donald L Raleigh
(74) *Attorney, Agent, or Firm* — Birch, Stewart, Kolasch & Birch, LLP

(57) ABSTRACT

An object is to provide a light deflection device and an optical device having a simple structure suitable for reducing the size and weight where a deflection angle can be increased. The light deflection device includes: a light deflection element that deflects incident light in one in-plane direction to be emitted; a driving unit that drives the light deflection element; a light collecting element that is disposed on a light emission side of the light deflection element; and an angle increasing optical element consisting of a diffraction element in which a periodic structure pitch gradually changes from a center of deflection of the light deflection element toward an outer side.

19 Claims, 8 Drawing Sheets

(51) Int. Cl.
*G02F 1/13* (2006.01)
*G02F 1/29* (2006.01)

(58) Field of Classification Search
CPC ......... G02B 27/0172; G02F 1/13; G02F 1/29; G02F 2203/24
See application file for complete search history.

(56) References Cited

U.S. PATENT DOCUMENTS

| | | | |
|---|---|---|---|
| 10,750,145 B1* | 8/2020 | Shipton | H04N 9/3105 |
| 2004/0114203 A1* | 6/2004 | Batchko | G02B 5/1876 359/3 |
| 2005/0024482 A1 | 2/2005 | Yonekubo | |
| 2010/0225876 A1 | 9/2010 | Escuti et al. | |
| 2012/0188467 A1 | 7/2012 | Escuti et al. | |
| 2018/0124384 A1* | 5/2018 | Huh | G02F 1/29 |
| 2020/0271839 A1 | 8/2020 | Saitoh et al. | |
| 2021/0041610 A1 | 2/2021 | Saitoh et al. | |

FOREIGN PATENT DOCUMENTS

| | | | | |
|---|---|---|---|---|
| JP | 2005-274847 A | 10/2005 | | |
| JP | 2010-525394 A | 7/2010 | | |
| JP | 2019-45574 A | 3/2019 | | |
| JP | 2019045574 A | * 3/2019 | ............ | G02B 26/10 |
| WO | WO 2019/093228 A1 | 5/2019 | | |
| WO | WO 2019/189675 A1 | 10/2019 | | |

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2020/032727, dated Mar. 10, 2022, with an English translation.
International Search Report (Form PCT/ISA/210) for International Application No. PCT/JP2020/032727, dated Oct. 13, 2020, with an English translation.
Japanese Notice of Reasons for Refusal for corresponding Japanese Application No. 2021-543077, dated Aug. 30, 2022, with an English translation.
Japanese Notice of Reasons for Refusal for corresponding Japanese Application No. 2021-543077, dated Apr. 4, 2023, with an English translation.

* cited by examiner

LIGHT DEFLECTION DEVICE AND OPTICAL DEVICE

CROSS-REFERENCE TO RELATED APPLICATIONS

This application is a Continuation of PCT International Application No. PCT/JP2020/032727 filed on Aug. 28, 2020, which claims priority under 35 U.S.C. § 119(a) to Japanese Patent Application No. 2019-156724 filed on Aug. 29, 2019. The above application is hereby expressly incorporated by reference, in its entirety, into the present application.

BACKGROUND OF THE INVENTION

1. Field of the Invention

The present invention relates to a light deflection device having a simple structure suitable for reducing the size and weight where a deflection angle can be increased, and an optical device including the light deflection device.

2. Description of the Related Art

Currently, a laser light deflection technique is applied to various fields. Examples of the light deflection technique include an aberration correction system for free-space optical communication and a scanning system for laser radar.

In the related art, as a laser light deflector or a pointing optical system, for example, a gimbal mirror or a galvanometer mirror has been widely used. These methods are direct and simple methods because the mirror is mechanically moved to control a direction of laser light.

In addition, regarding the light deflector, a configuration described in U.S. Pat. No. 7,969,558B in which a light source and an optical receiver are provided in a rotary stage to rotate the entire optical system is also known.

SUMMARY OF THE INVENTION

However, in the method of the related art, it is necessary to control a relatively large mirror or a rotary stage along with a large physical operation. Therefore, there is a problem in that the method is not suitable for a system requiring a reduction in size and weight or for a use requiring low power consumption.

An object of the present invention is to solve the problems of the related art and to provide: a light deflection device having a simple structure suitable for reducing the size and weight where a deflection angle can be increased, and an optical device including the light deflection device.

In order to achieve the object, a light deflection device according to the present invention has the following configurations.

[1] A light deflection device comprising:
a light deflection element that deflects incident light to be emitted;
a driving unit that drives the light deflection element;
an angle increasing optical element that is disposed downstream of the light deflection element in a light traveling direction and increases an angle range of a deflection angle of light emitted from the light deflection element, the angle increasing optical element consisting of a diffraction element having different periodic structure pitches in a plane; and
a light collecting element that is disposed downstream of the light deflection element in the light traveling direction.

[2] The light deflection device according to [1],
in which an optical path length between centers of the angle increasing optical element and the light collecting element is shorter than a focal length of the light collecting element.

[3] The light deflection device according to [1] or [2],
in which the diffraction element in the angle increasing optical element is a diffraction element in which the periodic structure pitch gradually changes from a center of the deflection angle of the light deflection element toward an outer side.

[4] The light deflection device according to any one of [1] to [3],
in which the angle increasing optical element is a liquid crystal diffraction element.

[5] The light deflection device according to [4],
in which the liquid crystal diffraction element includes an optically-anisotropic layer that is formed using a composition including a liquid crystal compound and has a liquid crystal alignment pattern in which a direction of an optical axis derived from the liquid crystal compound changes while continuously rotating in at least one in-plane direction.

[6] The light deflection device according to [5],
in which the liquid crystal alignment pattern of the optically-anisotropic layer is a concentric circular pattern having a concentric circular shape where the one in-plane direction in which the direction of the optical axis derived from the liquid crystal compound changes while continuously rotating moves from an inner side toward an outer side.

[7] The light deflection device according to any one of [5] or [6],
in which the optically-anisotropic layer includes a liquid crystal compound that is twisted and aligned along a helical axis extending in a thickness direction.

[8] The light deflection device according to [7],
in which the liquid crystal diffraction element includes two optically-anisotropic layers having opposite twisted directions in which the liquid crystal compound is twisted and aligned along the helical axis extending in the thickness direction.

[9] The light deflection device according to [8],
in which the optically-anisotropic layer in which the liquid crystal compound is not twisted and aligned is provided between the two optically-anisotropic layers.

[10] The light deflection device according to any one of [1] to [9],
in which the light collecting element is a condenser lens element.

[11] The light deflection device according to any one of [1] to [10],
in which the light collecting element is a diffraction element having different periodic structure pitches in a plane.

[12] The light deflection device according to [11],
in which the light collecting element is a liquid crystal diffraction element.

[13] The light deflection device according to [12],
in which the light collecting element is a liquid crystal diffraction element including an optically-anisotropic layer that is formed using a composition including a liquid crystal compound and has a liquid crystal alignment pattern in which a direction of an optical axis derived from the liquid crystal compound changes while continuously rotating in at least one in-plane direction.

[14] The light deflection device according to [13],
in which the liquid crystal alignment pattern of the optically-anisotropic layer in the light collecting element is a concentric circular pattern having a concentric circular shape where the one in-plane direction in which the direction of the optical axis derived from the liquid crystal compound changes while continuously rotating moves from an inner side toward an outer side.

[15] The light deflection device according to [13] or [14],
in which the optically-anisotropic layer in the light collecting element includes a liquid crystal compound that is twisted and aligned along a helical axis extending in a thickness direction.

[16] The light deflection device according to any one of [1] to [15],
in which the light deflection element is an optical phase modulation element.

[17] The light deflection device according to any one of [1] to [16],
in which the light deflection element is a liquid crystal optical phase modulation element.

[18] The light deflection device according to any one of [1] to [15],
in which the light deflection element is a MEMS light deflection element.

[19] An optical device comprising:
the light deflection device according to any one of [1] to [18];
a light source that emits light to the light deflection element of the light deflection device; and
a light-receiving element.

According to an aspect of the present invention, it is possible to provide a light deflection device having a simple structure suitable for reducing the size and weight where a deflection angle can be increased, and an optical device including the light deflection device.

DESCRIPTION OF THE PREFERRED EMBODIMENTS

Hereinafter, a light deflection device according to an embodiment of the present invention will be described with reference to the drawings. In each of the drawings, for easy visual recognition, the reduced scale of components is different from the actual scale.

In the present specification, numerical ranges represented by "to" include numerical values before and after "to" as lower limit values and upper limit values.

In addition, "perpendicular" or "parallel" regarding an angle represents a range of the exact angle ±10°.

In the present specification, Re(λ) represents an in-plane retardation at a wavelength λ. Unless specified otherwise, the wavelength λ refers to 550 nm.

In the present specification, Re(λ) is a value measured at the wavelength λ using AxoScan (manufactured by Axometrics, Inc.). By inputting an average refractive index ((nx+ny+nz)/3) and a film thickness (d (μm)) to AxoScan, the following expressions can be calculated.

$$Re(\lambda) = R0(\lambda) \qquad \text{Slow Axis Direction (°)}$$

R0(λ) is expressed as a numerical value calculated by AxoScan and represents Re(λ).

(Light Deflection Device)

A configuration of the light deflection device according to the embodiment of the present invention will be described using conceptual diagrams of FIGS. 1 to 3.

Figure 1:
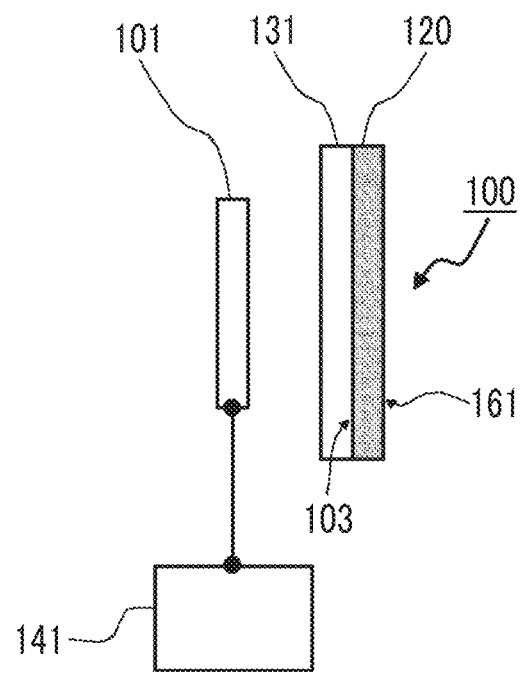
FIG. 1 is a conceptual diagram showing an example of a light deflection device according to the present invention.

As shown in FIG. 1, a light deflection device 100 according to the embodiment of the present invention includes a light deflection element 101, a light collecting element 131, and an angle increasing optical element 120 in order from the upstream side (the left side in FIG. 1) in a traveling direction of light (light beam). The light deflection element 101 is connected to a drive unit 141.

In the following description, the upstream and the downstream refer to the upstream and the downstream in the light traveling direction.

The light collecting element 131 and the angle increasing optical element 120 are disposed on an emission side (downstream) of the light deflection element 101 as shown in FIG. 1.

As shown in FIG. 1, the light collecting element 131 and the angle increasing optical element 120 may be disposed to abut against each other and may be further fixed using an adhesive or the like.

Figure 2:
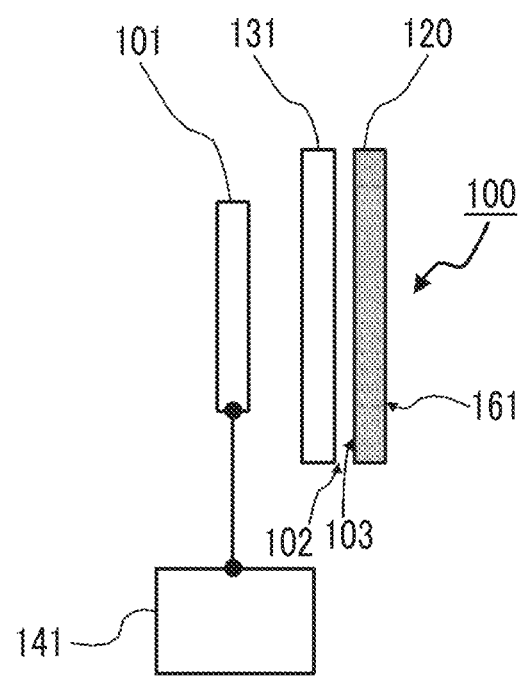
FIG. 2 is a conceptual diagram showing another example of the light deflection device according to the present invention.

In addition, even in a case where the light collecting element 131 and the angle increasing optical element 120 are disposed to be spaced at an interval 102 such that they do not deviate from a deflection angle range of light emitted from the light deflection element 101 as shown in FIG. 2, the same effects as those of the present invention can be obtained.

Depending on the kind of the light, the light may generate heat during passing. By providing the interval 102, a problem caused in a case where the heat generated from the light during passing melts the adhesive or the like used for fixing the light deflection element 101 and the light collecting element 131 and fixing the light collecting element 131 and the angle increasing optical element 120 can be avoided. The interval 102 is preferably 0.1 to 100 mm.

In a case where the interval 102 is provided, an incident surface 103 of the angle increasing optical element 120 is in contact with an air layer. Therefore, optionally, a non-reflective coating may be formed on an emission surface 161 and/or the incident surface 103.

Figure 3:
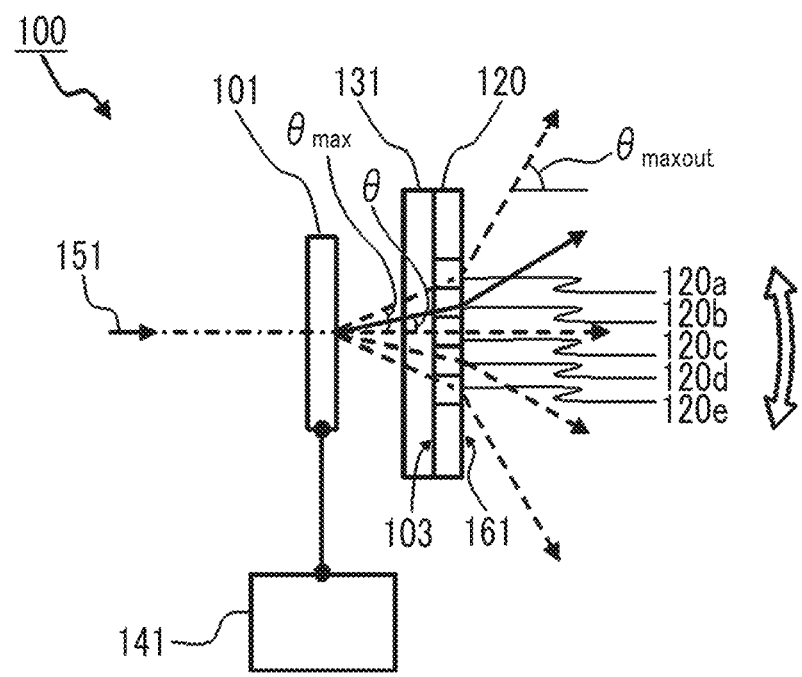
FIG. 3 is a conceptual diagram showing an action of the light deflection device shown in FIG. 1.

FIG. 3 is a conceptual diagram showing an action of the light deflection device 100 according to the embodiment of the present invention.

As shown in FIG. 3, the light deflection element 101 deflects light emitted from a light source (not shown) by a predetermined angle θ (refer to an arrow of a solid line). The polarization angle θ of the light deflection element 101 is changed by the drive unit 141 described below. That is, as indicated by an arrow of a broken line in FIG. 3, the polarization angle θ of the light deflection element 101 is appropriately changed by the drive unit 141 such that the light traveling direction is changed.

The light that is deflected by the light deflection element 101 passes through the light collecting element 131, and is subsequently diffracted by the angle increasing optical element 120 consisting of a diffraction element having different periodic structure pitches in a plane such that the deflection angle increases. The light collecting element 131 will be described below in detail.

In FIG. 3, a case where an angle θ of deflection of the light deflection element 101 is counterclockwise with respect to the light traveling direction in FIG. 3 seen from a direction perpendicular to the paper plane is set as a positive direction, and a maximum value in a variable range of the angle θ in the light deflection element 101 is set as a maximum deflection angle θmax. In the light deflection device 100 according to the embodiment of the present invention, a periodic structure pitch (period p described below) in the angle increasing optical element 120 described below is determined such that, in a case where light having the maximum deflection angle θmax is incident into the angle increasing optical element 120, an emission angle is a desired maximum emission angle θmaxout in the light deflection device 100.

As a result, even in a case where the maximum deflection angle θmax of the light deflection element 101 decreases, the maximum deflection angle θmax of the light deflection element 101 can be increased to the desired maximum emission angle θmaxout in the light deflection device 100 by the angle increasing optical element 120.

Likewise, even in a case where the angle θ is a negative direction, that is, a clockwise direction, by determining the periodic structure pitch such that the emission angle at the maximum deflection angle θmax as the maximum value in a variable range of the angle θ is the desired maximum emission angle θmaxout in the light deflection device 100, the maximum deflection angle θmax can be increased to the desired maximum emission angle θmaxout.

Although described in detail below, in the angle increasing optical element 120 consisting of the diffraction element, as the periodic structure pitch decreases, the diffraction angle increases. In addition, in the light deflection device 100, in order to increase the deflection angle of emitted light, the diffraction angle of the angle increasing optical element 120 gradually decreases from the center of deflection (deflection orientation) from the light deflection element 101 toward the outer side (both end portions).

This implies that a relationship of pa<pb<pc is satisfied in FIG. 3, where pa, pb, and pc represent periodic structure pitches (rotation periods p) of regions 120a, 120b, and 120c of the angle increasing optical element 120, respectively. Likewise, a relationship of pe<pd<pc is satisfied, where pd and pe represent periodic structure pitches of regions 120d and 120e, respectively.

This way, in a case where the absolute value of the angle θ is between 0 and the maximum deflection angle θmax and the angle θ of light emitted from the light deflection element 101 is small, the periodic structure pitch is set to be large such that the light is slightly diffracted in the angle increasing optical element 120. In addition, the angle θ of light emitted from the light deflection element 101 approaches the maximum deflection angle θmax, the periodic structure pitch gradually decreases such that the light is largely diffracted in the angle increasing optical element 120.

As a result, the angle range of emitted light of the light deflection element 101 is ±θmax, whereas the emission angle of light emitted from the angle increasing optical element 120 is increased to ±θmaxout.

Here, in a case where an incidence angle of light before being incident into the angle increasing optical element 120 consisting of the diffraction element is represented by $\theta_1$, a refractive index of a medium on the incidence side is represented by $n_1$, an emission angle of light emitted from the angle increasing optical element 120 is represented by $\theta_2$, a refractive index of a medium on the emission side is represented by $n_2$, a wavelength of light is represented by λ, the periodic structure pitch of the angle increasing optical element is represented by p, and a diffraction order is represented by m, these values are associated with each other by the following Expression (101).

$$n_1 \cdot \sin \theta_1 - n_2 \cdot \sin \theta_2 = m \cdot \lambda / p \qquad (101)$$

As described below, by changing the periodic structure pitch p (period p) of the angle increasing optical element 120, the angle of emitted light from the angle increasing optical element 120 can be changed.

In consideration of Snell's law, the absolute value of the final angle of emission from air can be increased to about 80°. Therefore, the angle θ can be increased up to a significantly large angle. In addition, by continuously changing the periodic structure pitch (period) p of the angle increasing optical element 120 in a plane, light can be continuously emitted in any direction.

(Light Collecting Element)

As described above, the light deflection device 100 includes the light deflection element 101, the light collecting element 131 according to the embodiment of the present invention, and the angle increasing optical element 120 in order from the upstream side in the light traveling direction.

The light collecting element 131 is a well-known light collecting element and slightly collects light incident into the light deflection element 101.

The light deflection device 100 according to the embodiment of the present invention includes the light collecting element 131 such that light (light beam) emitted from the light deflection device 100 (angle increasing optical element 120) can be converted into appropriate parallel light to improve straightness. The action of the light collecting element 131 will be described below in detail.

In the present invention, the light collecting element is not particularly limited, and all of the well-known optical elements that can collect light (light beam) can be used.

As the light deflection device 100 according to the embodiment of the present invention, a configuration including the light deflection element 101, the angle increasing optical element 120, and the light collecting element 131 in order from the upstream side in the light traveling direction is also preferably used.

(Light Deflection Element)
[MEMS Deflection Element]

Figure 4:
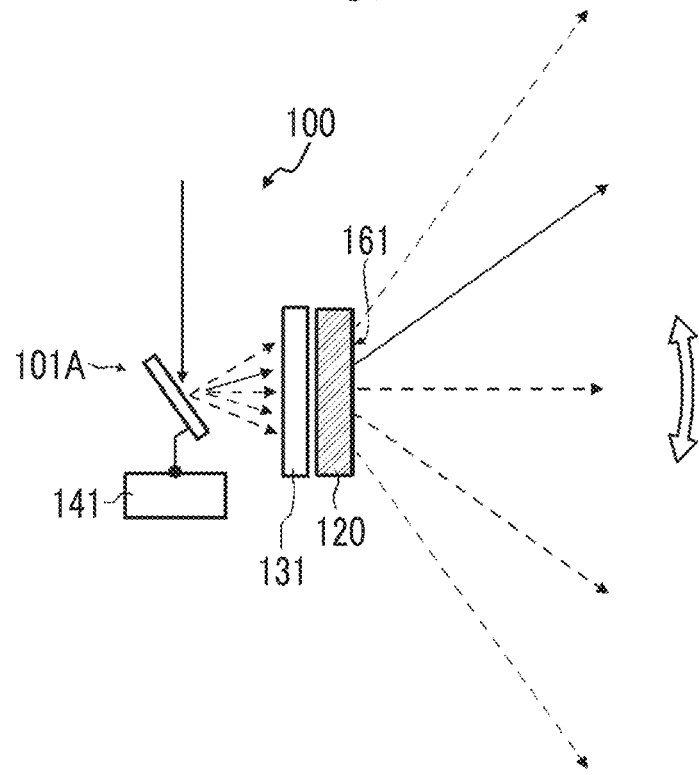
FIG. 4 is a conceptual diagram showing another example of the light deflection device according to the present invention.

FIG. 4 conceptually shows an example of the light deflection device according to the embodiment of the present invention including the micro-electromechanical systems (MEMS) light deflection element.

The MEMS light deflection element swings a mirror using a piezoelectric actuator or the like to deflect light (deflection scanning).

In the light deflection device 100 shown in FIG. 4, light emitted from a light source (not shown) is incident into a mirror of the MEMS light deflection element 101A, is reflected in a direction corresponding to an angle of the mirror surface of the MEMS light deflection element 101A, and is incident into the light collecting element 131 and the angle increasing optical element 120. The deflection angle of the MEMS light deflection element 101A is determined depending on the angle of the mirror surface with respect to incidence light, and by swinging the mirror using a piezoelectric actuator or the like, light is deflected (deflection scanning).

In the light deflection device 100 according to the embodiment of the present invention, the MEMS light deflection element 101A used as the light deflection element is not particularly limited, and all of the well-known MEMS light deflection elements (for example, a MEMS scanner (light scanner), a MEMS light deflector, a MEMS mirror, or a DMD) that swings a mirror using a piezoelectric actuator to deflect light (deflection scanning), for example, a MEMS light deflection element described in JP2012-208352A, a MEMS light deflection element described in JP2014-134642A, or a MEMS light deflection element described in JP2015-22064A can be used.

(Drive Unit)

The drive unit 141 is connected to the light deflection element 101. The drive unit 141 is a well-known drive unit that drives the light deflection element 101 according to the configuration of the light deflection element 101. By driving the light deflection element 101, the drive unit 141 can change the deflection angle θ of the light deflection element 101. In the light deflection device 100, the drive unit 141 can sequentially change the deflection angle θ of the light deflection element 101 such that scanning using light can be performed.

(Angle Increasing Optical Element)
[Liquid Crystal Diffraction Element]

Figure 5:
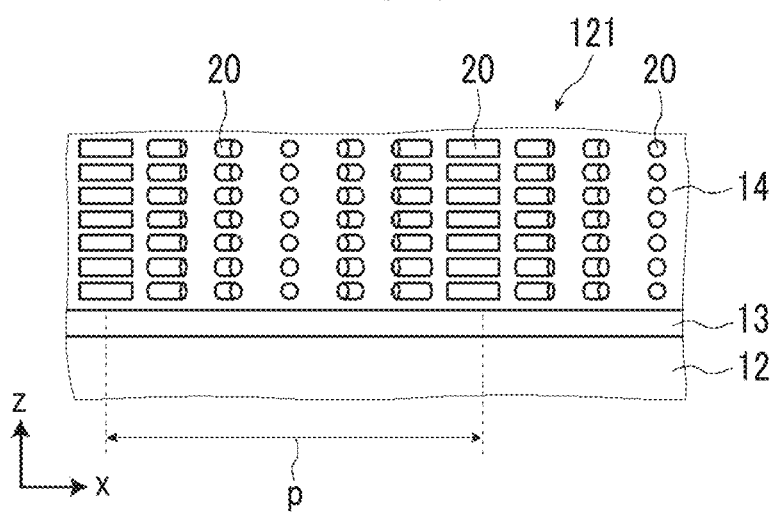
FIG. 5 is a conceptual diagram showing a liquid crystal diffraction element.

FIG. 5 is an enlarged view conceptually showing a part of a liquid crystal diffraction element 121 as an example of the angle increasing optical element consisting of the diffraction element. FIG. 5 is a diagram showing the liquid crystal diffraction element 121 in case of being in the same direction as that of FIGS. 1 to 3, and is a side view showing the liquid crystal diffraction element 121.

The liquid crystal diffraction element 121 has a sheet shape and includes a support 12, an alignment film 13, and an optically-anisotropic layer 14.

As described above, the liquid crystal diffraction element 121 as the angle increasing optical element diffracts light deflected by the light deflection element 101 in a deflection direction of the light deflection element 101 such that the light deflected by the light deflection element 101 is further deflected. In the light deflection device 100, by using the light deflection element 101 in combination with the liquid crystal diffraction element 121, light can be deflected at a deflection angle of the maximum emission angle θmaxout that is significantly more than the maximum deflection angle θmax of the light deflection element 101.

In the example shown in the drawing, a sheet surface direction of the liquid crystal diffraction element 121 is defined as "x-y direction", and a thickness direction is defined as "z direction". In FIG. 5, a horizontal direction is a direction (axis A direction described below) in which an optical axis derived from a liquid crystal compound rotates in one in-plane direction, and this direction is a x direction. Accordingly, a y direction is a direction perpendicular to the paper plane of FIG. 5.

In addition, in FIGS. 1 to 3, the up-down direction corresponds to the x direction, a direction perpendicular to the paper plane corresponds to the y direction, and the horizontal direction corresponds to the z direction. The x direction matches the deflection direction from the light deflection element 101. Regarding this point, the same can also be applied to FIG. 4 described below.

In FIGS. 1 to 3, the liquid crystal diffraction element 121 is planar. However, the liquid crystal diffraction element 121 may be curved without being limited to being planar.

<Support>

As the support 12, various sheet-shaped materials (films or plate-shaped materials) can be used as long as they can support the alignment film and the optically-anisotropic layer.

As the support 12, a transparent support is preferable, and examples thereof include a polyacrylic resin film such as polymethyl methacrylate, a cellulose resin film such as cellulose triacetate, and a cycloolefin polymer film. Examples of the cycloolefin polymer film include trade name "ARTON", manufactured by JSR Corporation and trade name "ZEONOR", manufactured by Zeon Corporation).

The support 12 may be a flexible film or may be a non-flexible substrate such as a glass substrate.

<Alignment Film>

In the liquid crystal diffraction element 121, the alignment film 13 is formed on a surface of the support 12.

The alignment film 13 is an alignment film for aligning a liquid crystal compound 20 to a predetermined liquid crystal alignment pattern during the formation of the optically-anisotropic layer 14.

Although described below, in the liquid crystal diffraction element 121, the optically-anisotropic layer 14 has a liquid crystal alignment pattern in which a direction of an optical axis 22 derived from the liquid crystal compound 20 changes while continuously rotating in one in-plane direction. Accordingly, the alignment film 13 of the liquid crystal diffraction element 121 is formed such that the optically-anisotropic layer 14 can form the liquid crystal alignment pattern.

In the optically-anisotropic layer 14 of the liquid crystal diffraction element 121, in the liquid crystal alignment pattern, a length over which the direction of the optical axis 22 rotates by 180° in the one in-plane direction (the direction along the axis A described below) in which the direction of the optical axis 22 changes while continuously rotating is set as a single period Λ (the rotation period p of the optical axis 22). In the optically-anisotropic layer 14 of the light deflection device 100 according to the embodiment of the present invention, the single period gradually decreases from the center of deflection (deflection orientation (deflection direction)) from the deflection element 101 toward the outer side.

In addition, the rotation direction of the optical axis of the liquid crystal compound 20 is reversed in the direction along the axis A (arrow x direction) at the center of deflection of the deflection element 101. Accordingly, the alignment film 13 of the liquid crystal diffraction element 121 is formed such that the optically-anisotropic layer 14 can form the liquid crystal alignment pattern.

As the alignment film 13, various well-known films can be used.

Examples of the alignment film 13 of the optically-anisotropic layer 14 include a rubbed film formed of an organic compound such as a polymer, an obliquely deposited film formed of an inorganic compound, a film having a microgroove, and a film formed by lamination of Langmuir-Blodgett (LB) films formed with the Langmuir-Blodgett technique using an organic compound such as ω-tricosanoic acid, dioctadecylmethylammonium chloride, or methyl stearate.

Examples of the alignment film 13 include a film obtained by rubbing a surface of a polymer layer. The rubbing treatment is performed by rubbing a surface of a polymer layer with paper or fabric in a given direction multiple times. As the kind of the polymer used for the alignment film, for example, polyimide, polyvinyl alcohol, a polymer having a polymerizable group described in JP1997-152509A (JP-H9-152509A), or an alignment film such as alignment films described in JP2005-97377A, JP2005-99228A, and JP2005-128503A can be preferably used.

The vertical alignment film described in the present invention refers to an alignment film in which a major axis of a molecule of the polymerizable rod-like liquid crystal compound according to the present invention is aligned to be substantially perpendicular to a rubbing direction of the vertical alignment film. The thickness of the alignment film is not necessarily large as long as it can provide the alignment function, and is preferably 0.01 to 5 μm and more preferably 0.05 to 2 μm.

As the alignment film 13, a so-called photo-alignment film obtained by irradiating a photo-alignable material with polarized light or non-polarized light can also be used. That is, the photo-alignment film may be prepared by applying the photo-alignable material to the support 12.

The irradiation of polarized light can be performed in a direction perpendicular or oblique to the photo-alignment film, and the irradiation of non-polarized light can be performed in a direction oblique to the photo-alignment film.

Preferable examples of the photo-alignable material used in the photo-alignment film that can be used in the present invention include: an azo compound described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, polyamide, or ester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A. Among these, an azo compound, a photocrosslinking polyimide, polyamide, ester, a cinnamate compound, or a chalcone compound is more preferable.

In the present invention, the photo-alignment film is preferably used.

Figure 9:
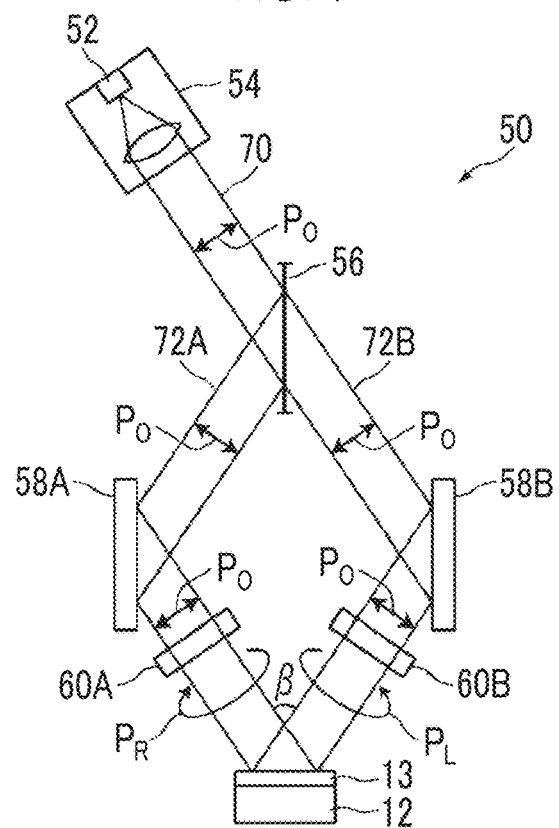
FIG. 9 is a conceptual diagram showing an exposure device that exposes an alignment film.

FIG. 9 is a schematic diagram showing an exposure device for an alignment film, in which the photo-alignment material is applied to the support 12 and dried to form the alignment film and the alignment film is exposed to form an alignment pattern.

An exposure device 50 includes: a light source 54 including a laser 52; a polarization beam splitter 56 that splits laser light 70 emitted from the laser 52 into two beams 72A and 72B; mirrors 58A and 58B that are disposed on optical paths of the splitted two beams 72A and 72B; and λ/4 plates 60A and 60B.

The light source 54 emits linearly polarized light $P_0$. The λ/4 plate 60A converts the linearly polarized light $P_0$ into right circularly polarized light $P_R$, and the λ/4 plate 60B converts the linearly polarized light $P_0$ into left circularly polarized light $P_L$.

The support 12 including the alignment film 13 on which the alignment pattern is not yet formed is disposed at an exposed portion, the two beams 72A and 72B intersect and interfere with each other on the alignment film 13, and the alignment film 13 is irradiated with and exposed to the interference light. Due to the interference at this time, the polarization state of light with which the alignment film 13 is irradiated periodically changes according to interference fringes. As a result, an alignment pattern in which the alignment state periodically changes can be obtained.

In the exposure device 50, by changing an intersecting angle β between the two beams 72A and 72B, the period of the alignment pattern can be changed. That is, by adjusting the intersecting angle β in the exposure device 50, in the alignment pattern in which the optical axis 22 derived from the liquid crystal compound 20 continuously rotates in the one in-plane direction, the length of the single period (rotation period p=period p) over which the optical axis 22 rotates by 180° in the one in-plane direction in which the optical axis 22 rotates can be adjusted.

By forming the optically-anisotropic layer 14 described below on the alignment film 13 having the alignment pattern in which the alignment state periodically changes, the optically-anisotropic layer 14 having the liquid crystal alignment pattern corresponding to the period can be formed.

In addition, by rotating the optical axes of the λ/4 plates 60A and 60B by 90°, respectively, the rotation direction of the optical axis 22 can be reversed.

Figure 8:
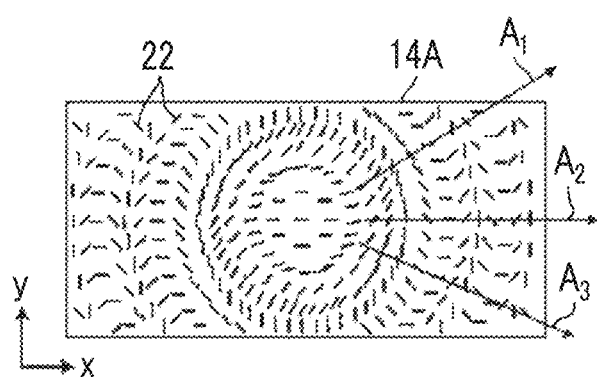
FIG. 8 is a schematic plan view showing another example of the optically-anisotropic layer.
Figure 10:
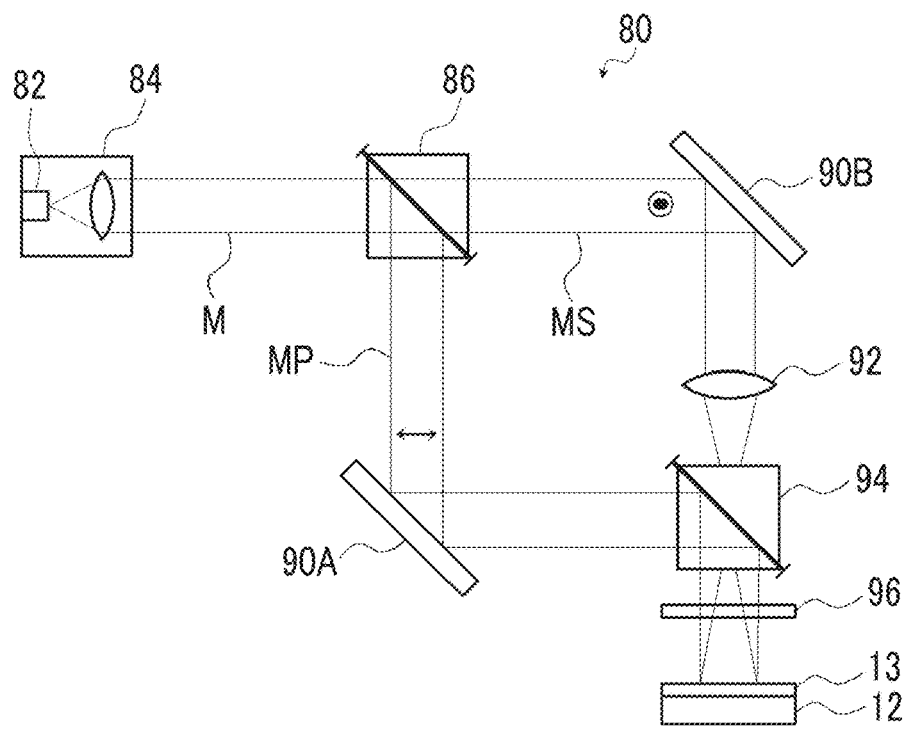
FIG. 10 is a conceptual diagram showing another example of the exposure device that exposes an alignment film.

In addition, in order to expose the alignment film 13, an exposure device 80 conceptually shown in FIG. 10 is suitably used. The exposure device 80 shown in FIG. 10 is also used to form a liquid crystal alignment pattern having a concentric circular shape as shown in FIG. 8 described below.

An exposure device 80 includes: a light source 84 that includes a laser 82; a polarization beam splitter 86 that splits the laser light M emitted from the laser 82 into S polarized light MS and P polarized light MP; a mirror 90A that is disposed on an optical path of the P polarized light MP; a mirror 90B that is disposed on an optical path of the S polarized light MS; a lens 92 (convex lens) that is disposed on the optical path of the S polarized light MS; a polarization beam splitter 94; and a λ/4 plate 96.

The P polarized light MP that is split by the polarization beam splitter 86 is reflected from the mirror 90A to be incident into the polarization beam splitter 94. On the other hand, the S polarized light MS that is split by the polarization beam splitter 86 is reflected from the mirror 90B and is collected by the lens 92 to be incident into the polarization beam splitter 94.

The P polarized light MP and the S polarized light MS are multiplexed by the polarization beam splitter 94, are converted into right circularly polarized light and left circularly polarized light by the λ/4 plate 96 depending on the polarization direction, and are incident into the alignment film 13 on the support 12.

Due to interference between the right circularly polarized light and the left circularly polarized light, the polarization state of light with which the alignment film 13 is irradiated periodically changes according to interference fringes. The intersecting angle between the right circularly polarized light and the left circularly polarized light changes from the inner side to the outer side of the concentric circle. Therefore, an exposure pattern in which the pitch changes from the inner side to the outer side can be obtained. As a result, in the alignment film 13, a concentric circular alignment pattern in which the alignment state periodically changes can be obtained.

In the exposure device 80, the length of the single period (rotation period p) over which the optical axis 22 of the liquid crystal compound 20 continuously rotates by 180° in the one in-plane direction can be controlled by changing the refractive power of the lens 92 (the F number of the lens 92), the focal length of the lens 92, the distance between the lens 92 and the alignment film 13, and the like.

In addition, by adjusting the refractive power of the lens 92 (the F number of the lens 92), the length of the single period over which the optical axis 22 rotates by 180° in the one in-plane direction in which the optical axis 22 continuously rotates can be changed. Specifically, the length of the single period over which the optical axis 22 rotates by 180° can be changed depending on the degree to which light transmitted through the lens 92 is collected for interference with parallel light. More specifically, in a case where the refractive power of the lens 92 is weak, light is approximated to parallel light. Therefore, the length of the single period over which the optical axis 22 rotates by 180° gradually decreases from the inner side toward the outer side, and the F number increases. Conversely, in a case where the refractive power of the lens 92 becomes stronger, the length of the single period over which the optical axis 22 rotates by 180° rapidly decreases from the inner side toward the outer side, and the F number decreases.

This way, the configuration of changing the length of the single period (rotation period p) over which the optical axis 22 rotates by 180° in the one in-plane direction in which the optical axis 22 continuously rotates can also be used in the configuration in which the optical axis 22 of the liquid crystal compound 20 changes while continuously rotating only in the one in-plane direction as the arrow x direction.

For example, by gradually decreasing the single period over which the optical axis 22 rotates by 180° in the arrow X direction, an optical element that allows transmission of light to be collected can be obtained. In addition, by reversing the direction in which the optical axis 22 in the liquid crystal alignment pattern rotates by 180°, an optical element that allows transmission of light to be diffused only in the arrow X direction can be obtained. By reversing the turning direction of incident circularly polarized light, an optical element that allows transmission of light to be diffused only in the arrow X direction can be obtained.

Further, depending on the uses of the optical element such as a case where it is desired to provide a light amount distribution in transmitted light, a configuration in which regions having partially different single periods over which the optical axis 22 rotates by 180° in the arrow x direction are provided can also be used instead of the configuration in which the length of the single period over which the optical axis 22 rotates by 180° gradually changes in the arrow x direction. For example, as a method of partially changing the single period over which the optical axis 22 rotates by 180°, for example, a method of scanning and exposing the photoalignment film to be patterned while freely changing a polarization direction of laser light to be collected can be used.

In the liquid crystal diffraction element 121, the alignment film 13 is provided as a preferable aspect and is not an essential configuration requirement.

For example, the following configuration can also be adopted, in which, by forming the alignment pattern on the support 12 using a method of rubbing the support 12, a method of processing the support 12 with laser light or the like, or the like, the optically-anisotropic layer 14 has the liquid crystal alignment pattern in which the direction of the optical axis 22 derived from the liquid crystal compound 20 changes while continuously rotating in at least one in-plane direction.

<Optically-Anisotropic Layer>

In the liquid crystal diffraction element 121, the optically-anisotropic layer 14 that is a cured layer of the liquid crystal composition including the liquid crystal compound 20 is provided on a surface of the alignment film 13.

The optically-anisotropic layer 14 has a liquid crystal alignment pattern in which the optical axis (slow axis) of the liquid crystal compound is arranged in at least one in-plane direction of the optically-anisotropic layer and in which the direction of the optical axis 22 of the liquid crystal compound 20 changes while rotating in the one in-plane direction.

In the liquid crystal diffraction element 121 according to the embodiment, a retardation $R(=\Delta n \cdot d1)$ of the optically-anisotropic layer 14 in the thickness direction (in the drawing, the z direction) with respect to light having the wavelength λ is 0.36λ to 0.64λ. The retardation R is preferably 0.4λ to 0.6λ, more preferably 0.45λ to 0.55λ, and still more preferably 0.5λ. $\Delta n$ represents a birefringence index of the optically-anisotropic layer 14, and d1 represents a thickness. For example, in a case where light having a wavelength of 940 nm is assumed as incidence light, the retardation R with respect to the light having a wavelength of 940 nm may be in a range of 338 to 602 nm and is preferably 470 nm.

By having the retardation R, the optically-anisotropic layer 14 exhibits a function as a general λ/2 plate, that is, a function of imparting a phase difference of 180° ($=\pi=\lambda/2$) between linearly polarized light components of incidence light perpendicular to each other.

The liquid crystal diffraction element 121 functions as a transmission diffraction grating. The principle in which the liquid crystal diffraction element 121 functions as a diffraction grating will be described with reference to FIGS. 5 and 6.

Figure 6:
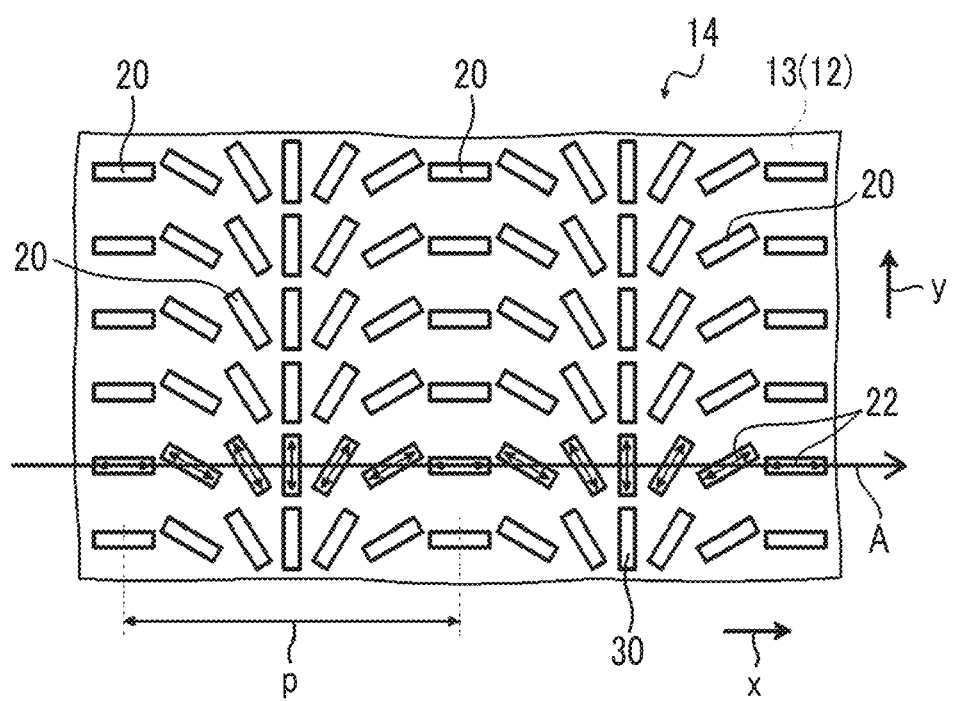
FIG. 6 is a schematic plan view showing an optically-anisotropic layer.

FIG. 6 is a schematic plan view showing the optically-anisotropic layer 14, that is, a diagram showing FIG. 5 in case of being seen from the top.

As shown in FIGS. 5 and 6, in the optically-anisotropic layer 14, the liquid crystal compound 20 is immobilized in the liquid crystal alignment pattern in which the optical axis 22 changes while continuously rotating in the one in-plane direction. In the example shown in the drawing, the optical axis 22 changes while continuously rotating in the direction along the axis A in FIG. 6 that matches the arrow x direction. That is, the liquid crystal compound 20 is aligned such that an angle between an in-plane component of the major axis (the axis of extraordinary light: director) of the liquid crystal compound 20 defined as the optical axis 22 and the axis A changes while rotating.

As shown in FIG. 6, in the optically-anisotropic layer 14, the direction of the optical axis 22 of the liquid crystal compound 20 is the same in the liquid crystal compound 20 in which that is arranged in a direction perpendicular to the axis A, that is, in an arrow y direction. The optically-anisotropic layer 14 exhibits the above-described general function as a λ/2 plate in regions having the same direction of the optical axis 22 of the liquid crystal compound 20 in the y direction.

The liquid crystal alignment pattern in which the direction of the optical axis 22 changes while rotating is a pattern in which the liquid crystal compound 20 is aligned and immobilized such that an angle between the optical axis 22 of the liquid crystal compound 20 arranged along the axis A and the axis A varies depending on positions in the axis A direction and gradually changes from φ to φ+180° or φ−180°.

In the following description, as shown in FIG. 6, in the optically-anisotropic layer 14, the liquid crystal alignment pattern in which the optical axis 22 of the liquid crystal compound 20 is parallel to a surface of the optically-anisotropic layer 14, local regions (unit regions) where the direction of the optical axis 22 is constant, that is, regions where the liquid crystal compound 20 is arranged in the arrow y direction are arranged in the x direction perpendicular to the arrow y direction, and the direction of the optical axis 22 change while continuously rotating in the in-plane direction (the direction along the axis A) in the plurality of local regions arranged in the arrow x direction will be referred to as "horizontal rotation alignment".

"Changing while continuously rotating" may represent that regions having the same angle such as 30° rotate to be adjacent to each other in a range of 0° to 180° (=0°) as shown in FIGS. 5 and 6. In addition, a change in the angle of the optical axis 22 in the axis A direction may be rotation at different angle intervals instead of a uniform angle interval. In the present invention, in a case where the average value of the directions of the optical axes 22 in the unit region changes linearly at a constant ratio, it can be said that the direction of the optical axis gradually changes. However, a change in the tilt of the optical axis between unit regions adjacent to each other in the axis A direction and having different tilts of the optical axes 22 is preferably 45° or less. It is preferable that a change in tilt between unit regions adjacent to each other is as small as possible.

In the optically-anisotropic layer 14, the distance over which the angle between the optical axis 22 and the axis A in the axis A direction changes from φ to φ+180° (returning to the original position), that is, the period over which the optical axis 22 rotates by 180° will be referred to as "rotation period p". The rotation period p is preferably 0.5 to 5 μm. As the rotation period p decreases, the diffraction angle from the optically-anisotropic layer 14, that is, the liquid crystal diffraction element 121 increases. Accordingly, the rotation period p may be determined depending on a wavelength of incidence light into the liquid crystal diffraction element 121 and a desired emission angle.

With the above-described configuration of the optically-anisotropic layer 14, the liquid crystal diffraction element 121 imparts a phase difference of λ/2 to the incidence light and emits incidence light incident at an incidence angle of 0°, that is, vertically incident light at an emission angle $\theta_2$.

Figure 7:
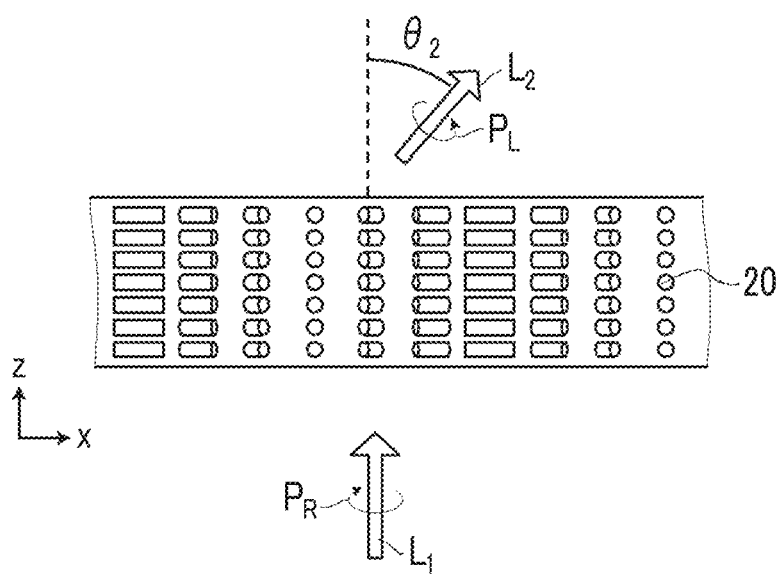
FIG. 7 is a conceptual diagram showing an effect of the optically-anisotropic layer.

That is, as shown in FIG. 7, in a case where light $L_1$ of right circularly polarized light $P_R$ is vertically incident into a surface of the optically-anisotropic layer 14, light $L_2$ of left circularly polarized light $P_L$ is emitted in a direction having an angle $\theta_2$ with respect to the normal direction. In other words, light being vertically incident into the surface of the optically-anisotropic layer 14 is light being incident along the normal line of the surface. In addition, in the following description, the light $L_1$ of right circularly polarized light $P_R$ incident into the optically-anisotropic layer 14 will also be referred to "incidence light $L_1$". Further, in the following description, the light $L_2$ of left circularly polarized light $P_L$ emitted the optically-anisotropic layer will also be referred to "emitted light $L_2$".

In the liquid crystal diffraction element 121, in a case where light having a predetermined wavelength is incident, as the rotation period p of the optically-anisotropic layer 14 decreases, the diffraction angle, that is, the emission angle of the emitted light $L_2$ increases. The emission angle of the emitted light $L_2$ is an angle between the normal direction of the optically-anisotropic layer 14 and the emitted light $L_2$.

The liquid crystal diffraction element 121 has different diffraction orientations for right circularly polarized light and left circularly polarized light. Therefore, regarding the diffraction direction of the emitted light $L_2$ from the liquid crystal diffraction element 121, the state of circularly polarized light to be incident into the liquid crystal diffraction element 121 is controlled to be incident. Accordingly, in a case where incidence light is linearly polarized light, by inserting the λ/4 plate to convert the linearly polarized light into left circularly polarized light or right circularly polarized light such that the converted light is incident, the orientation of diffraction of light can be controlled to only one of the right or left side.

The wavelength λ of light that causes the diffraction effect to occur due to the liquid crystal diffraction element 121 (optically-anisotropic layer 14) may be in an ultraviolet range, a visible range, or an infrared range or may be on an electromagnetic wave level.

At the same rotation period p, as the wavelength of the incidence light increases, the diffraction angle increases, and as the wavelength of the incidence light decreases, the diffraction angle decreases.

As the liquid crystal compound 20, a rod-like liquid crystal compound or a disk-like liquid crystal compound can be used.

As shown in FIG. 7, in a case where incidence light $L_1$ of right circularly polarized light $P_R$ is incident along the normal line of the surface of the liquid crystal diffraction element 121, emitted light $L_2$ of left circularly polarized light $P_L$ is emitted in a direction having the angle $\theta_2$ with respect to the normal direction.

On the other hand, in a case where left circularly polarized light is incident into the liquid crystal diffraction element 121 as incidence light, the incidence light is converted into right circularly polarized light in the optically-anisotropic layer 14, and the traveling direction is changed in a direction laterally opposite to the direction of the arrow of the emitted light $L_2$ in FIG. 7.

In the above description, the example in which incidence light is vertically incident into the optically-anisotropic layer is described. However, even in a case where incidence light is obliquely incident into the optically-anisotropic layer, the effect of transmission diffraction can also be obtained.

In a case where incidence light is obliquely incident into the optically-anisotropic layer, the rotation period may be designed in consideration of the incidence angle $\theta_1$ such that Expression (101) is satisfied and the desired diffraction angle $\theta_2$ can be obtained.

As described above, in the light deflection device 100 according to the embodiment of the present invention, light deflected from the light deflection element 101 is diffracted by the liquid crystal diffraction element 121 (optically-anisotropic layer 14) such that the light can be deflected at a deflection angle of the maximum emission angle θmaxout that is significantly more than the maximum deflection angle θmax of the light deflection element 101.

The diffraction angle of light of the optically-anisotropic layer 14 increases as the single period over which the optical axis 22 of the liquid crystal compound 20 rotates by 180°, that is, the rotation period p decreases.

In addition, in a case where the deflection directions (turning directions) of circularly polarized light to be incident are the same, the diffraction direction of light from the optically-anisotropic layer 14 is reversed by the rotation direction of the optical axis 22 of the liquid crystal compound 20.

That is, in a case where the incidence light $L_1$ is right circularly polarized light $P_R$ and the rotation direction of the optical axis 22 is clockwise in the axis A direction (arrow x direction) in a view from the emission surface side as shown in FIGS. 5 to 7, the emitted light $L_2$ is diffracted, for example, in the axis A direction.

On the other hand, in a case where the incidence light $L_1$ is right circularly polarized light $P_R$ and the rotation direction of the optical axis 22 is counterclockwise in the axis A direction from the emission surface side, the emitted light $L_2$ is diffracted in a direction opposite to the axis A direction.

Accordingly, in the optically-anisotropic layer 14 of the light deflection device 100 according to the embodiment of the present invention, the rotation period p of the optical axis 22 of the liquid crystal compound 20 in the axis A direction gradually decreases from the center of deflection (deflection orientation) from the light deflection element 101 toward the outer side. That is, the diffraction angle of light of the optically-anisotropic layer 14 increases toward the outer side in the deflection direction. For example, in the example shown in FIG. 3, in a case where the angle increasing optical element 120 is the liquid crystal diffraction element 121, the rotation periods p of the regions 120a, 120b, and 120c have a relationship of pa<pb<pc, and the rotation periods p of the regions 120c, 120d, and 120e have a relationship of pe<pd<pc.

Further, in the optically-anisotropic layer 14 of the light deflection device 100 according to the embodiment of the present invention, the rotation direction of the optical axis 22 of the liquid crystal compound 20 in the axis A direction is reversed at the center of deflection of the light deflection element 101. For example, in the example shown in the drawing, the rotation direction of the optical axis 22 in the axis A direction is set to be counterclockwise from the upstream side in the axis A direction to the center in the deflection direction, the rotation direction of the optical axis 22 is reversed at the center of deflection, and the rotation direction of the optical axis 22 is set to be clockwise from the center of deflection to the downstream side in the axis A direction.

In a case where the light deflection device 100 according to the embodiment of the present invention has the above-described configuration, light can be deflected at a deflection angle of the maximum emission angle θmaxout that is significantly more than the maximum deflection angle θmax of the light deflection element 101.

The rotation direction of the optical axis 22 is reversed at the center of the optically-anisotropic layer 14 in the axis A direction (arrow x direction), that is, in the one in-plane direction in which the optical axis 22 rotates. That is, in the light deflection device 100, typically, the center of deflection from the light deflection element 101 and the center of optically-anisotropic layer 14 in the axis A direction are matched to each other.

In the present invention, the rotation period p may decrease continuously or stepwise from the center of deflection toward the outside.

<Formation of Optically-Anisotropic Layer>

For example, the optically-anisotropic layer 14 is formed using the liquid crystal composition including the liquid crystal compound.

In order to form the optically-anisotropic layer 14, the liquid crystal composition including the liquid crystal compound may include other components such as a leveling agent, an alignment control agent, a polymerization initiator, or an alignment assistant in addition to the liquid crystal compound. By forming an alignment film on the support, applying the liquid crystal composition to the alignment film, and curing the applied liquid crystal composition, the optically-anisotropic layer consisting of the cured layer of the liquid crystal composition is obtained by immobilizing the predetermined liquid crystal alignment pattern can be obtained.

Next, each of the components of the liquid crystal composition according to the embodiment of the present invention will be described in detail.

The optically-anisotropic layer 14 is formed of a cured layer of a liquid crystal composition including a rod-like liquid crystal compound or a disk-like liquid crystal compound, and has a liquid crystal alignment pattern in which an optical axis of the rod-like liquid crystal compound or an optical axis of the disk-like liquid crystal compound is aligned as described above.

By forming an alignment film on the support 12, applying the liquid crystal composition to the alignment film, and curing the applied liquid crystal composition, the optically-anisotropic layer consisting of the cured layer of the liquid crystal composition can be obtained. Although the optically-anisotropic layer functions as a so-called λ/2 plate, the present invention includes an aspect where a laminate including the support 12 and the alignment film that are integrated functions as a λ/2 plate.

In addition, the liquid crystal composition for forming the optically-anisotropic layer includes a rod-like liquid crystal compound or a disk-like liquid crystal compound and may further include other components such as a leveling agent, an alignment control agent, a polymerization initiator, or an alignment assistant.

In addition, it is desirable that the optically-anisotropic layer has a wide range for the wavelength of incidence light and is formed of a liquid crystal material having a reverse birefringence index dispersion.

Further, it is also preferable that the optically-anisotropic layer can be made to have a substantially wide range for the wavelength of incidence light by imparting a twist component to the liquid crystal composition or by laminating different retardation layers. For example, in the optically-anisotropic layer, a method of realizing a λ/2 plate having a wide-range pattern by laminating two liquid crystal layers having different twisted directions is disclosed in, for example, JP2014-089476A and can be preferably used in the present invention.

—Rod-Like Liquid Crystal Compound—

As the rod-like liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. As the rod-like liquid crystal compound, not only the above-described low molecular weight liquid crystal molecules but also high molecular weight liquid crystal molecules can be used.

It is preferable that the alignment of the rod-like liquid crystal compound is immobilized by polymerization. Examples of the polymerizable rod-like liquid crystal compound include compounds described in Makromol. Chem., (1989), Vol. 190, p. 2255, Advanced Materials (1993), Vol. 5, p. 107, U.S. Pat. Nos. 4,683,327A, 5,622,648A, 5,770, 107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-80081A (JP-H11-80081A), and JP2001-64627. Further, as the rod-like liquid crystal compound, for example, compounds described in JP1999-513019A (JP-H11-513019A) and JP2007-279688A can also be preferably used.

—Disk-Like Liquid Crystal Compound—

As the disk-like liquid crystal compound, for example, compounds described in JP2007-108732A and JP2010-244038A can be preferably used.

In a case where the disk-like liquid crystal compound is used in the optically-anisotropic layer, the liquid crystal compound 20 rises in the thickness direction in the optically-anisotropic layer, and the optical axis 22 derived from the liquid crystal compound 20 is defined as an axis perpendicular to a disk surface, that is so-called, a fast axis.

The optically-anisotropic layer 14 can be formed by applying multiple layers of the liquid crystal composition to the alignment film 13.

The application of the multiple layers refers to repetition of the following processes including: preparing a first liquid crystal immobilized layer by applying the liquid crystal composition to the alignment film, heating the liquid crystal composition, cooling the liquid crystal composition, and irradiating the liquid crystal composition with ultraviolet light for curing; and preparing a second or subsequent liquid crystal immobilized layer by applying the liquid crystal composition to the liquid crystal immobilized layer, heating the liquid crystal composition, cooling the liquid crystal composition, and irradiating the liquid crystal composition with ultraviolet light for curing as described above. Even in a case where the optically-anisotropic layer 14 is formed by the application of the multiple layers as described above such that the total thickness of the optically-anisotropic layer 14 is large, the alignment direction of the alignment film 13 can be reflected from a lower surface of the optically-anisotropic layer 14 to an upper surface thereof.

FIG. 8 is a schematic plan view showing an optically-anisotropic layer in a design modification example of the liquid crystal diffraction element.

A liquid crystal alignment pattern in an optically-anisotropic layer 14A shown in FIG. 8 is different from the liquid crystal alignment pattern in the above-described optically-anisotropic layer 14. FIG. 8 shows only the optical axis 22. The optically-anisotropic layer 14A in FIG. 8 has the liquid crystal alignment pattern in which the direction of the optical axis 22 gradually changes while rotating in multiple directions from the center side toward the outer side, for example along axes $A_1$, $A_2$, $A_3$, and . . . .

That is, the liquid crystal alignment pattern in the optically-anisotropic layer 14A shown in FIG. 8 is a liquid crystal alignment pattern in which the optical axis 22 rotates in a radial shape. In other words, the liquid crystal alignment pattern in the optically-anisotropic layer 14A shown in FIG. 8 is a concentric circular pattern having a concentric circular shape where the one in-plane direction in which the direction of the optical axis changes while continuously rotating moves from an inner side toward an outer side.

Depending on the liquid crystal alignment pattern shown in FIG. 8, the absolute phase of incidence light changes by different amounts of change between local regions having different directions of the optical axes 22. In a case where the liquid crystal alignment pattern in which the optical axis changes in a radial shape while rotating as shown in FIG. 8 is provided, incident light can be caused to transmit as diverging light or collected light. That is, a function as a convex lens or a concave lens can be implemented by the liquid crystal alignment pattern in the optically-anisotropic layer 14.

In a preferable aspect of the light deflection device according to the embodiment of the present invention, the liquid crystal diffraction element 121 is used for the function of the concave lens of the optically-anisotropic layer 14A shown in FIG. 8. In this case, in a case where the center of the lens is matched to the center of emitted light of the light deflection element 101, the maximum deflection angle θmax of light emitted from the light deflection element can be increased most efficiently.

It is preferable that, as the size of divided regions (for example, 120a to 120e) of the liquid crystal diffraction element 121 decreases, the change is more smooth. The beam diameter of laser light to be emitted may be a finite value to the extent that there are no problems in practice. For example, the beam diameter may be 10 to several hundreds of micrometers.

In the light deflection device according to the embodiment of the present invention, by using the liquid crystal diffraction element 121A for the function of the concave lens of the optically-anisotropic layer 14A shown in FIG. 8, light can be deflected so as to be diffused in a radial shape from the center.

Figure 13:
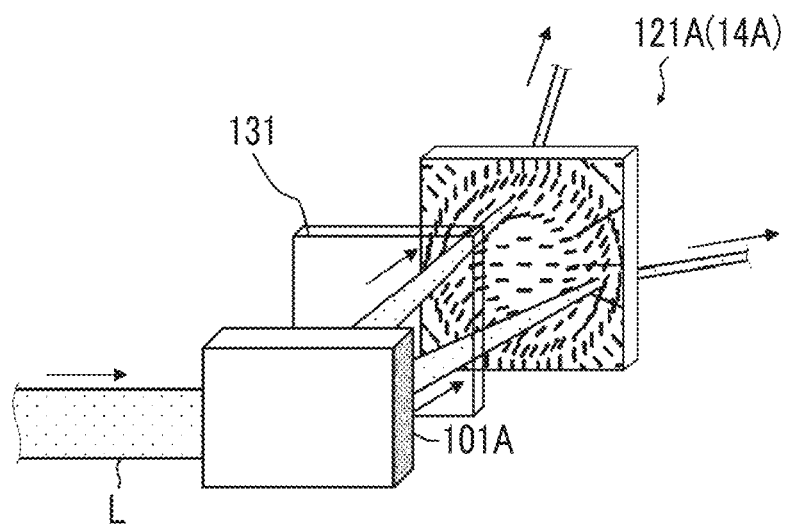
FIG. 13 is a conceptual diagram showing an action of an example of the light deflection device according to the present invention.

For example, in the light deflection device according to the embodiment of the present invention, as conceptually shown in FIG. 13, the liquid crystal diffraction element 121A including the optically-anisotropic layer 14A that functions as a concave lens is used, and a light deflection element 101A that deflects light in a radial shape is used as the light deflection element. The light deflection element 101A deflects light, for example, at an orientation of 0° to 360° in a polar angle range of 0° to 35°.

As a result, as shown in FIG. 13, the light L deflected in a radial shape from the light deflection element 101A is diffracted from the liquid crystal diffraction element 121A such that the deflection angle, that is, the azimuthal angle from the light deflection element 101A can be increased, and light can be deflected radially in a wide range.

In addition, in a preferable aspect of the light deflection device according to the embodiment of the present invention, the light collecting element 131 is provided. The light L is incident into the light deflection element 101A and deflected by the light collecting element, and the collected light is incident into the liquid crystal diffraction element 121A as it is. As a result, the light refracted by the liquid crystal diffraction element 121A is deflected and emitted as parallel light.

Examples of the light deflection element 101A that deflects light in a radial shape include a well-known MEMS (Micro Electro Mechanical Systems) light deflection element (for example, a MEMS scanner (light scanner), a MEMS light deflector, a MEMS mirror, or a digital micromirror device (DMD)) that swings a mirror using a piezoelectric actuator to deflect light (deflection scanning), for example, a MEMS light deflection element described in JP2012-208352A, a MEMS light deflection element described in JP2014-134642A, or a MEMS light deflection element described in JP2015-22064A.

In the above-described example, the liquid crystal compound 20 of the liquid crystal diffraction element faces one side in the thickness direction, but the present invention is not limited thereto.

Figure 11:
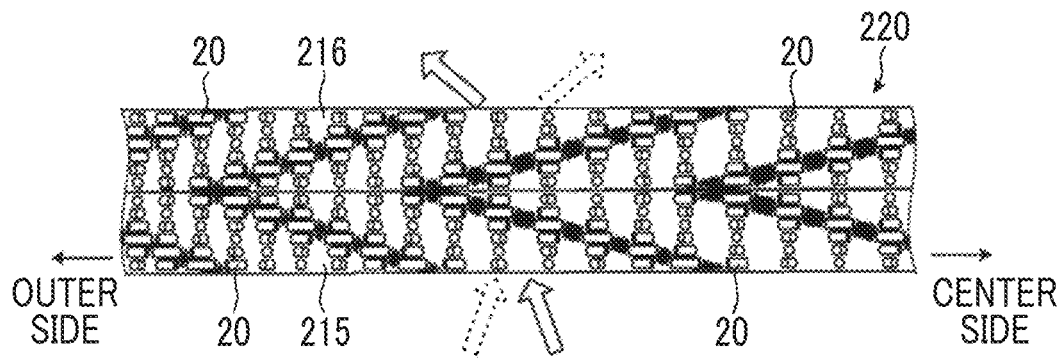
FIG. 11 is a conceptual diagram showing another example of the optically-anisotropic layer.

In the light deflection device according to the embodiment of the present invention, the optically-anisotropic layer forming the liquid crystal diffraction element may include the liquid crystal compound 20 that is twisted and aligned along a helical axis extending in the thickness direction as in a first optically-anisotropic layer 215 and a second optically-anisotropic layer 216 of a liquid crystal diffraction element 220 shown in FIG. 11. In the following description, the twisted alignment along the helical axis extending in the thickness direction will also simply referred to as "twisted alignment".

The first optically-anisotropic layer 215 and the second optically-anisotropic layer 216 in which the liquid crystal compound 20 is twisted and aligned are tilted optically-anisotropic layers in which, in a cross-sectional SEM image obtained by observing a cross-section of the liquid crystal diffraction element 220 with a scanning electron microscope (SEM), bright and dark lines derived from the twisted alignment of the liquid crystal compound 20 are tilted with respect to the normal line of an interface between the first optically-anisotropic layer 215 and the second optically-anisotropic layer 216 as shown in FIG. 11.

As described above, in the liquid crystal alignment pattern, in a case where the single period (rotation period p) over which the optical axis of the liquid crystal compound rotates by 180° gradually decreases in the direction in which the optical axis 22 rotates, the tilt angle of the bright and dark lines with respect to the normal line of the first optically-anisotropic layer 215 and the second optically-anisotropic layer 216 gradually decreases in the direction in which the optical axis 22 rotates. That is, in this case, the tilt angle of the bright and dark lines rises with respect to the main surface of the optically-anisotropic layer. Further, in this case, in the pattern of the bright and dark lines of the first optically-anisotropic layer 215 and the second optically-anisotropic layer 216, the period decreases in the direction in which the optical axis 22 rotates.

This way, in the optically-anisotropic layer including the twisted and aligned liquid crystal compound 20, the diffraction efficiency of light can be improved even by high-angle diffraction. As a result, as compared to the optically-anisotropic layer shown in FIG. 5 in which the liquid crystal compound is not twisted and aligned, a decrease in light amount in the optically-anisotropic layer can be suppressed, and the amount of emitted light can be improved.

In the liquid crystal diffraction element 220, the twisted direction in the twisted alignment of the liquid crystal compound 20 in the first optically-anisotropic layer 215 is different from that in the second optically-anisotropic layer 216. That is, in the first optically-anisotropic layer 215, the liquid crystal compound 20 is twisted and aligned clockwise in the light traveling direction. That is, in the second optically-anisotropic layer 216, the liquid crystal compound 20 is twisted and aligned counterclockwise in the light traveling direction.

Therefore, the direction of tilt of the bright and dark lines derived from the twisted alignment in the cross-sectional SEM image of the first optically-anisotropic layer 215 is different from that in the second optically-anisotropic layer 216.

In the first optically-anisotropic layer 215, for example, in a case where incidence light is right circularly polarized light, the effect of improving the diffraction efficiency is high for light that travels to the left side (outer side) indicated by a solid line in the drawing. However, in the first optically-anisotropic layer 215, for example, in a case where incidence light is right circularly polarized light, the effect of improving the diffraction efficiency is low for light that travels to the right side (center side) indicated by a broken line in the drawing.

On the other hand, in the second optically-anisotropic layer 216, in a case where incidence light is right circularly polarized light, conversely, the effect of improving the diffraction efficiency is low for light that travels to the left side (outer side) indicated by a solid line in the drawing. However, in the second optically-anisotropic layer 216, in a case where incidence light is right circularly polarized light, the effect of improving the diffraction efficiency is high for light that travels to the right side (center side) indicated by a broken line in the drawing.

The effects are opposite in a case where incidence light is left circularly polarized light.

In the liquid crystal diffraction element 220, in the region at the center of polarization, the incidence angle of incidence light into the optically-anisotropic layer is small. Therefore, both of the first optically-anisotropic layer 215 and the second optically-anisotropic layer 216 contribute to the improvement of the diffraction efficiency.

As a result, in the liquid crystal diffraction element 220 including the first optically-anisotropic layer 215 and the second optically-anisotropic layer 216 that have different twisted directions in the twisted alignment of the liquid crystal compound 20, the effect of improving the diffraction efficiency can be obtained over the entire region in the light deflection direction, and a large amount of light can be emitted in the entire range of the deflection angle.

In the optically-anisotropic layer in which the liquid crystal compound 20 is twisted and aligned, the twisted angle of the liquid crystal compound is not limited. The twisted angle of the liquid crystal compound may be appropriately set according to the deflection angle from the light deflection element, the desired diffraction efficiency, and the like.

In the optically-anisotropic layer in which the liquid crystal compound 20 is twisted and aligned, the twisted angle of the liquid crystal compound 20 is preferably 10° to 200°, more preferably 20° to 190°, and still more preferably 40° to 170°.

The twisted angle of the twisted and aligned liquid crystal compound 20 (the twisted angle in the thickness direction) refers to a twisted angle from a lower surface to an upper surface of the liquid crystal compound 20 that is twisted and aligned along the helical axis extending in the thickness direction in the optically-anisotropic layer.

Figure 12:
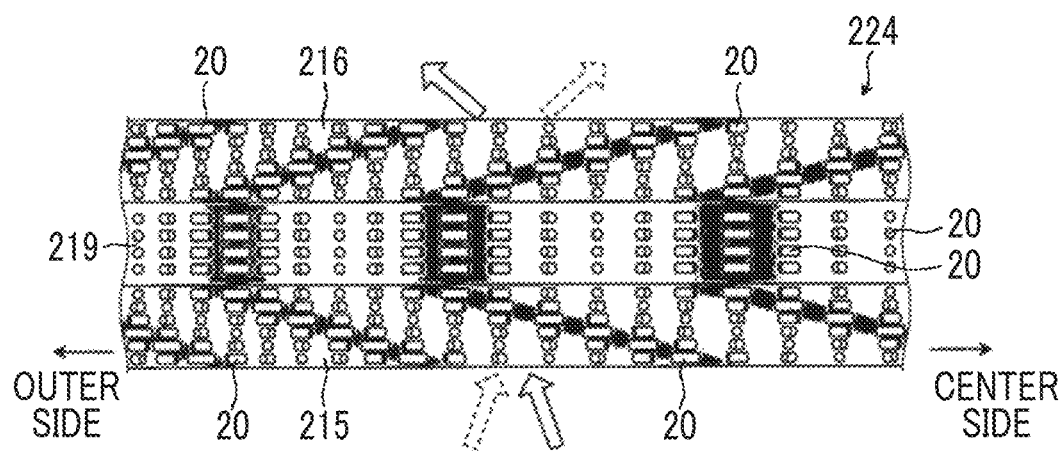
FIG. 12 is a conceptual diagram showing another example of the optically-anisotropic layer.

This way, in the liquid crystal diffraction element including the first optically-anisotropic layer 215 and the second optically-anisotropic layer 216 in which the liquid crystal compound 20 is helically twisted and aligned, a third optically-anisotropic layer 219 in which the liquid crystal compound 20 is not twisted and aligned may be provided between the first optically-anisotropic layer 215 and the second optically-anisotropic layer 216 as in a liquid crystal diffraction element 224 shown in FIG. 12.

The third optically-anisotropic layer 219 in which the liquid crystal compound is not twisted and aligned is a non-tilted optically-anisotropic layer in which bright and dark lines extend in the normal direction.

By providing the third optically-anisotropic layer 219 between the first optically-anisotropic layer 215 and the second optically-anisotropic layer 216, a larger amount of light can be emitted at a wider deflection angle due to the synergistic effect of diffraction from the third optically-anisotropic layer 219.

In the above description, the liquid crystal diffraction element 121 is used as a transmission diffraction element. However, in the light deflection device according to the embodiment of the present invention, a reflective liquid crystal diffraction element can also be used.

In this case, the same forming method can be adopted, except that the liquid crystal compositions are different from each other. By using a cholesteric liquid crystal as liquid crystal and using the same alignment film as that of the transmission diffraction element, reflective diffracted light can be generated, and the angle can be increased.

[Action of Light Collecting Element]

As described above, in a preferable aspect, the light deflection device 100 in the example shown in the drawing includes the light collecting element 131 provided downstream of the light deflection element 101.

The diffraction of light from the optically-anisotropic layer 14 (liquid crystal diffraction element 121) gradually increases from the center toward the outer side in the deflection direction.

On the other hand, light, that is, a light beam deflected by the light deflection device 100 is thick in practice. Therefore, to be exact, the diffraction angle of light of the optically-anisotropic layer 14 on the inner side (the center side of deflection) and the outer side in the deflection direction are different from each other, and the diffraction angle on the outer side is more than that on the inner side. Therefore, the light diffracted from the liquid crystal diffraction element 121 increases in diameter so as to be slightly diffused.

On the other hand, by providing the light collecting element 131 such that the light incident into the liquid crystal diffraction element 121 slightly decreases in diameter, light emitted from the light deflection device 100 (liquid crystal diffraction element 121) can be converted into parallel light to improve straightness.

As a result, by providing the light collecting element 131, the scanning of light using the light deflection device 100 can be accurately performed even in a case where an object to be scanned with light is distant from the light deflection device 100.

The refractive power (lens power) of the light collecting element 131 is not limited.

That is, the refractive power of the light collecting element 131 may be appropriately set to refractive power capable of emitting suitable light based on the diffraction angle of light of the liquid crystal diffraction element 121 and the in-plane distribution thereof (that is, an in-plane distribution function of a diffraction pitch), the deflection angle of light from the light deflection device 100, the distance between the light deflection device 100 and the object to be scanned with light, the diameter of incidence light (beam diameter), and the like.

In addition, the position of the light collecting element 131 is not particularly limited as long as it is present downstream of the light deflection element 101.

The position of the light collecting element 131 may be present upstream or downstream of the liquid crystal diffraction element 121.

It is preferable that an optical path length of light passing through the centers of the light collecting element 131 and the liquid crystal diffraction element 121 is shorter than a focal length of the light collecting element 131. By setting the optical path length of the light collecting element 131 and the liquid crystal diffraction element 121 to be shorter than the focal length of the light collecting element 131, the straightness of light emitted from the light deflection device 100 (liquid crystal diffraction element 121) can be suitably improved.

In the light deflection device according to the embodiment of the present invention, various well-known light collecting elements such as a refractive lens or the diffraction element can be used.

Various materials such as various optical glasses, optical plastics, or a crystalline material can be used as a material of the refractive lens as long as they can appropriately refract light.

Examples of the optical glasses include various glass materials such as materials used for ground glass or flint glass.

As the optical plastic, a transparent plastic is preferable, and examples thereof include a polyacrylic resin such as polymethyl methacrylate, polycarbonate, polystyrene, and a cycloolefin polymer.

The above-described liquid crystal diffraction element can be preferably used as the light collecting element including the diffraction element. Specifically, in the above-described liquid crystal diffraction element, the rotation period p gradually decreases from the center of deflection of the light deflection element 101 toward the outer side such that the traveling direction of diffracted light faces the center side of the liquid crystal diffraction element. That is, the diffraction angle of light of the liquid crystal diffraction element increases toward the outer side in the deflection direction. As a result, a function as a convex lens (light collecting element) can be realized.

In addition, in a preferable example of the light collecting element including the diffraction element, a method of using photonic crystal without using a liquid crystal material can also be used with the same principle as that of the above-described liquid crystal diffraction element.

For example, using a method described in JP2017-111277A, the same diffraction effect as that of the above-described liquid crystal alignment pattern can be obtained.

In addition, another preferable example of the light collecting element including the diffraction element is a hologram diffraction element that exposes a photosensitive material or the like to a pattern shape by holography and diffracts light according to a difference in the refractive index of the exposed portion.

For example, all of the well-known hologram diffraction elements (holographic diffraction element (diffraction grating)) such as a hologram sheet described in JP2016-184124A or can be used.

In addition, as still another preferable example of the light collecting element including the diffraction element, a surface relief diffraction element that diffracts light with a fine uneven portion formed on the surface can also be used.

For example, all of the well-known surface relief diffraction elements (surface relief diffraction gratings) such as a structure described in JP2015-93439A can be used.

[λ/4 Plate]

Figure 14:
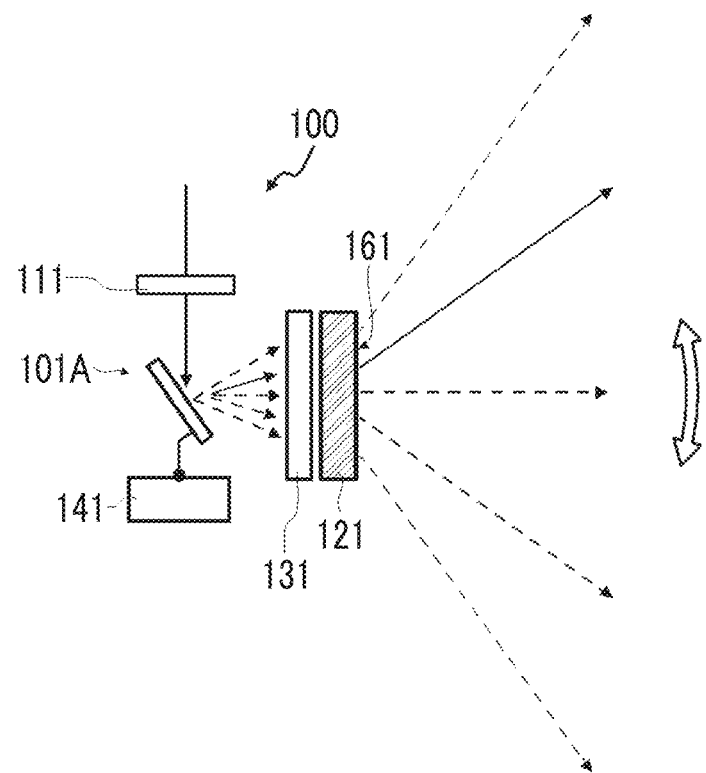
FIG. 14 is a conceptual diagram showing an example of the light deflection device according to the present invention.

In a case where the above-described liquid crystal diffraction element is used as the angle increasing optical element, a λ/4 plate is suitably used as shown in FIG. 14.

The λ/4 plate 111 is a well-known λ/4 plate (¼ phase difference plate) that converts linearly polarized light deflected from the light deflection element 101 into circularly polarized light.

As the λ/4 plate 111, a well-known λ/4 plate can be used without any particular limitation. Accordingly, the λ/4 plate 111 may be derived from a polymer or may be derived from liquid crystal.

In the light deflection device 100 shown in FIG. 14, light emitted from a light source (not shown) is converted into, for example, right circularly polarized light by the λ/4 plate 111, and the right circularly polarized light is incident into the MEMS light deflection element 101A.

In the light deflection device 100 including the MEMS light deflection element 101A, the λ/4 plate 111 may be disposed between the MEMS light deflection element 101A and the liquid crystal diffraction element 121. However, from the viewpoints that, for example, the size of the λ/4 plate 111 can be reduced, in the light deflection device 100 including the MEMS light deflection element 101A, it is preferable that the λ/4 plate 111 is provided upstream of the MEMS light deflection element 101A.

In addition, in the light deflection device 100 including the MEMS light deflection element 101A, in a case where circularly polarized light is incident the λ/4 plate 111 is not necessarily provided.

In the light deflection device 100, it is preferable that the mirror of the MEMS light deflection element 101A is not depolarized. Specifically, for example, a metal mirror having a mirror surface is used. In the metal mirror, in a case where circularly polarized light is reflected, the twisting (sense) of circularly polarized light is reversed. Therefore, in order to twist circularly polarized light in a desired direction during incidence into the liquid crystal diffraction element, it is preferable that circularly polarized light having an opposite twisted direction is incident into the MEMS light deflection element.

In a case where the incidence angle is large with respect to the mirror surface of the MEMS light deflection element 101A, the polarization state of light changes because P polarized light (P wave) and S polarized light (S wave) have different reflectivities and different phases. Accordingly, the polarization state may be adjusted in advance such that desired circularly polarized light can be obtained after being reflected from the mirror. Examples of a method of adjusting the polarization state include a method of using elliptically polarized light. In addition, a phase difference plate for adjusting the phase may be disposed such that desired circularly polarized light can be obtained after being reflected from the mirror of the MEMS light deflection element 101A.

Further, a circularly polarized light mirror, for example, a cholesteric liquid crystal layer may be used as the mirror of the MEMS light deflection element 101A. In a circularly polarized light mirror, for example, a cholesteric liquid crystal layer, the twisted direction of circularly polarized light is maintained during reflection. Therefore, in order to twist circularly polarized light in a desired direction during incidence into the liquid crystal diffraction element 121, it is preferable that circularly polarized light having the same twisted direction is incident into the MEMS light deflection element 101A.

Light that is converted into circularly polarized light by the λ/4 plate 111 is deflected from the MEMS light deflection element 101A. The deflection direction of light of the MEMS light deflection element 101A matches the axis A direction (arrow x direction) as in the above-described light deflection device 100.

In FIG. 14, reference numeral 141 represents a drive unit of the MEMS light deflection element 101A. As the drive unit 141, a well-known unit corresponding to the configuration of the MEMS light deflection element 101A and the like may be used.

The light deflected from the MEMS light deflection element 101A is diffracted from the liquid crystal diffraction element 121, the deflection angle is increased as described above, and the diffracted light is emitted from the light deflection device 100 at the desired maximum emission angle θmaxout that is more than the maximum deflection angle θmax of the MEMS light deflection element 101A.

In the light deflection device according to the embodiment of the present invention, the light deflection element is not limited to the MEMS light deflection element 101A, and well-known various light deflection elements such as a galvanometer mirror, a polygon mirror, or an optical phased array deflection element (optical phase modulation element) element can be used.

In particular, from the viewpoint that a mechanical movable portion is small and the number of mechanical movable portions is small, the above-described MEMS light deflection element 101A and the optical phased array deflection element can be suitably used as the light deflection element.

[Liquid Crystal Optical Phase Modulation Element]

As an example of the optical phased array deflection element, a structure of a liquid crystal optical phase modulation element 132 will be described.

Figure 15:
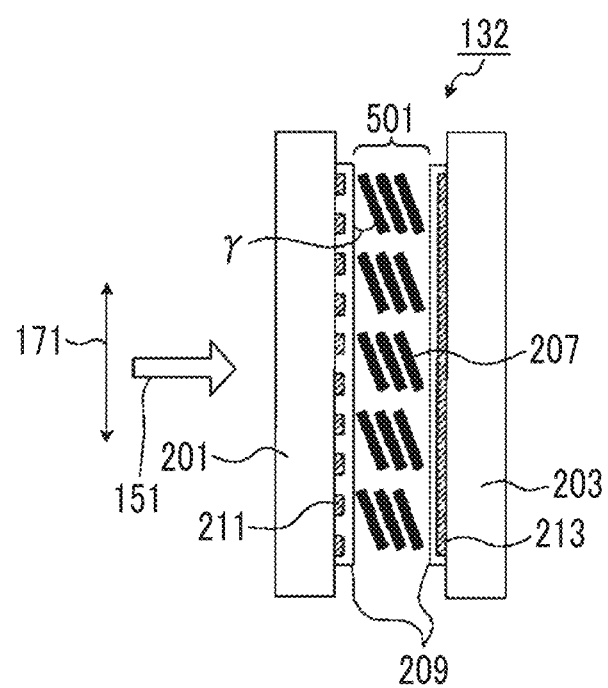
FIG. 15 is a conceptual diagram showing another example of the light deflection element according to the present invention.

FIG. 15 is a cross-sectional view showing an example of the structure of the liquid crystal optical phase modulation element used in the present invention. Here, as the liquid crystal optical phase modulation element described herein as an example, a liquid crystal optical phase modulation element according to Example 1 described in JP2003-295153A is adopted. In the present invention, the liquid crystal optical phase modulation element is not limited to the example shown in the drawing, and all of well-known the liquid crystal optical phase modulation elements used as a light deflection element can be used.

In FIG. 15, a nematic liquid crystal layer 501 as an example of the liquid crystal layer is homogeneously aligned by an alignment layer 209 that is formed to cover a composite electrode 211 of a first transparent substrate 201 and an alignment layer 209 that is formed to cover a common electrode 213 of a second transparent substrate 203 in the liquid crystal optical phase modulation element 132 such that a tilt angle γ of a director 207 of a p-type (positive) liquid crystal molecule during non-application of an electric field is 5° or less.

In the liquid crystal optical phase modulation element 132 shown in FIG. 15, the incidence light 151 as the linearly polarized light in the direction indicated by the arrow 171 is converted into linearly polarized light parallel to a light deflection direction from the liquid crystal optical phase modulation element 132. The incidence light 151 is P polarized light in case of being seen from the emission surface 161 of the liquid crystal diffraction element 121.

The first transparent substrate 201 and the second transparent substrate 203 are fixed through a spacer (not shown) such that the nematic liquid crystal layer 501 has a predetermined thickness of several micrometers to several tens of micrometers.

In addition, although not shown in FIG. 15, in order to prevent short-circuit between the composite electrode 211 and the common electrode 213, a transparent insulating film formed of tantalum pentoxide, silicon dioxide, or the like may be formed on at least one of the composite electrode 211 or the common electrode 213. In addition, it is desirable that a multi-layer film consisting of a high refractive index film and a low refractive index film is used as the transparent insulating film to improve transmittance.

The common electrode 213 formed on the second transparent substrate 203 may be a full-surface electrode formed of a transparent conductive film.

With the above-described structure, different voltages can be applied to the transparent electrodes. Therefore, by applying an electric field such that an in-plane distribution of the directors 207 of the liquid crystal molecules is controlled to a predetermined refractive index distribution, incidence light can be deflected by a predetermined angle θ to be emitted due to the lens effect.

This principle is known as a liquid crystal lens, and the same effects can be obtained even with various structures other than the present aspect.

The single liquid crystal optical phase modulation element 132 is shown in FIG. 15, but the present invention is not limited thereto. A plurality of liquid crystal optical phase modulation elements 132 may be provided.

In addition, in the liquid crystal optical phase modulation element 132, an alignment direction of a liquid crystal cell (liquid crystal compound) may be parallel or vertical. In a case where the alignment direction of the liquid crystal cell is parallel, this configuration contributes to an increase in maximum deflection angle θmax and also contributes to an increase in deflection angle of the liquid crystal optical phase modulation element 132, that is, in deflection angle of the light deflection device 100.

(Drive Unit)

The drive unit is connected to the liquid crystal optical phase modulation element 132.

The drive unit is a well-known drive unit that drives the liquid crystal optical phase modulation element 132 according to the configuration of the liquid crystal optical phase modulation element 132.

In the above description, in a preferable aspect of the light deflection device according to the embodiment of the present invention, the liquid crystal diffraction element 121 including the optically-anisotropic layer 14 having the liquid crystal alignment pattern in which a direction of an optical axis derived from the liquid crystal compound changes while continuously rotating in at least one in-plane direction is used as a diffraction element (angle increasing optical element), but the present invention is not limited thereto.

That is, as the angle increasing optical element in the light deflection device according to the embodiment of the present invention, all of the well-known diffraction elements can be used as long as the periodic structure pitch gradually changes such that the diffraction angle increases from the center of deflection of the light deflection element toward the outer side.

In a preferable example, a method of using photonic crystal without using a liquid crystal material can also be used with the same principle as that of the above-described liquid crystal diffraction element.

For example, as in a method described in JP2017-111277A, a transparent substrate that is formed of an inorganic material and an uneven pattern forming portion that is formed of a plurality of protrusions formed of Si or the like are provided at a regular interval such that structural birefringence occurs and the azimuthal angle is changed in a plane. As a result, the same diffraction effect as that of the above-described liquid crystal alignment pattern can be obtained.

Examples of another preferable diffraction element include a hologram diffraction element that exposes a photosensitive material or the like to a pattern shape by holography and diffracts light according to a difference in the refractive index of the exposed portion.

The hologram diffraction element may have a periodic refractive index distribution that gradually changes from the center of deflection of the light deflection element toward both end portions such that the diffraction angle increases, for example, from the center of deflection of the light deflection element toward the outside.

The hologram diffraction element is not particularly limited as long as the above-described requirements are satisfied. For example, all of the well-known hologram diffraction elements (holographic diffraction elements (diffraction gratings)) such as a hologram sheet described in JP2016-184124A can be used.

As still another preferable diffraction element, a surface relief diffraction element that diffracts light with a fine uneven portion formed on the surface can also be used.

In the surface relief diffraction element, an uneven grating period (relief pattern) may gradually change from the center of deflection of the light deflection element toward both end portions such that the diffraction angle increases, for example, from the center of deflection of the light deflection element toward both end portions.

The surface relief diffraction element is not particularly limited as long as the above-described requirements are satisfied. For example, all of the well-known surface relief diffraction elements (surface relief diffraction gratings) such as a structure described in JP2015-93439A can be used.

In a case where the hologram diffraction element or the surface relief diffraction element is used as the diffraction element, light incident into the diffraction element is not necessarily circularly polarized light. Accordingly, in this case, the λ/4 plate 111 is unnecessary.

As can be seen from the above description, the light deflection device according to the embodiment of the present invention can realize a light and small light deflection device that has a simple structure, can be easily driven, has no mechanical movable portion, and thus is suitable for free-space optical communication, a laser radar, or an light scanner where light can be deflected at a large angle.

The light deflection device according to the embodiment of the present invention can realize a high-performance light deflection device having a simple configuration using a simple driving method.

The light deflection device according to the embodiment of the present invention can be used in various optical devices.

Figure 16:
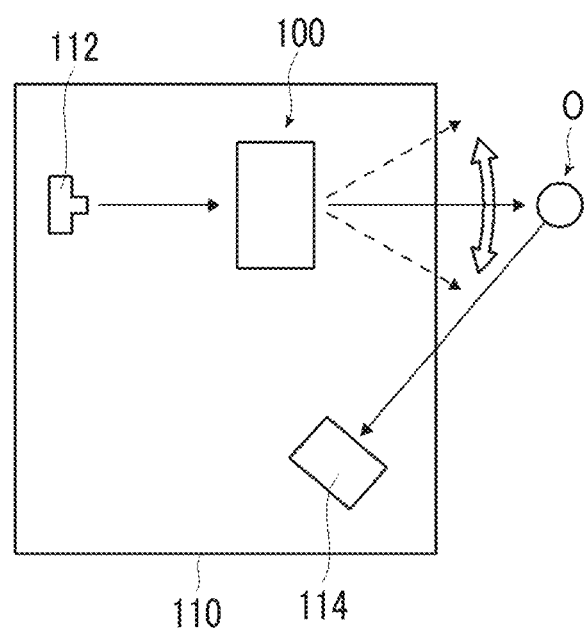
FIG. 16 is a diagram conceptually showing an example of an optical device according to the present invention.

FIG. 16 conceptually shows an example of an optical device according to the embodiment of the present invention including the light deflection device according to the embodiment of the present invention.

An optical device 110 shown in FIG. 16 includes a light source 112, the light deflection device 100 according to the embodiment of the present invention, and a light-receiving element 114.

In the optical device 110, light emitted from the light source 112 is deflected by the light deflection device 100 according to the embodiment of the present invention. The deflected light is emitted from the optical device 110 and reflected from a measurement target O. The reflected light from the measurement target O is incident again into the optical device 110, is received by the light-receiving element 114, and is measured.

The optical device 110 according to the embodiment of the present invention is used as various sensors. Examples of the sensors using the optical device 110 include a distance-measuring sensor using light detection and ranging (so-called LiDAR), a shape-measuring sensor, and a recognition sensor.

In the optical device 110, the light source 112 is not particularly limited, and an appropriate light source may be selected depending on the measurement target, the use of the optical device 110, and the like. Examples of the light source 112 include a semiconductor laser, a laser diode (LD), and a light emitting diode (LED). For example, in a case where the optical device 110 is used as a distance-measuring sensor, for example, a light source that emits infrared light is preferably used as the light source 112. In addition, depending on targets to be measured and environments, for example, a light source that emits light having a wavelength other than infrared light or an electromagnetic wave can also be preferably used. For example, a laser light source that emits visible light may be used as the light source 112.

The light-receiving element 114 is not particularly limited, and various well-known light-receiving elements can be used as long as they can measure light emitted from the light source 112. Examples of the light-receiving element 114 include a charge coupled device (CCD) sensor and a photomultiplier.

In addition, the light deflection device according to the embodiment of the present invention has a simple structure, can be easily driven, and can deflect light at a large angle. Therefore, the light deflection device according to the embodiment of the present invention can be used for various uses where a reduction in weight and size is desired and light is scanned.

Examples of the uses of the light deflection device according to the embodiment of the present invention include a drawing device using beam scanning, a beam scanning projection display, a beam scanning head-up display, and beam scanning augmented reality (AR) glasses. In this case, the light deflection device according to the embodiment of the present invention can be used as a device that deflects light in a wide wavelength range including visible light.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

<Preparation of Light Deflection Element>

A micromirror device described in JP2014-134642A was prepared as a light deflection element.

<Preparation of Angle Increasing Optical Element>

As angle increasing optical element, the following liquid crystal diffraction element was prepared.

(Formation of Alignment Film)

A glass substrate was used as the support. The following coating solution for forming an alignment film was applied to the support by spin coating. The support on which the coating film of the coating solution for forming an alignment film was formed was dried using a hot plate at 60° C. for 60 seconds. As a result, an alignment film was formed.

| Coating Solution for forming Alignment Film | |
|---|---|
| Material A for photo-alignment | 1.00 part by mass |
| Water | 16.00 parts by mass |
| Butoxyethanol | 42.00 parts by mass |
| Propylene glycol monomethyl ether | 42.00 parts by mass |

-Material A for Photo-Alignment-

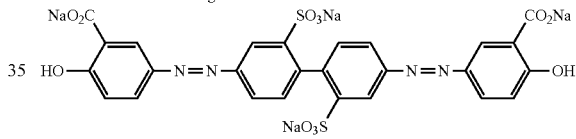

(Exposure of Alignment Film)

The alignment film was exposed using the exposure device shown in FIG. 10 to form an alignment film P-1 having an alignment pattern.

In the exposure device, a laser that emits laser light having a wavelength (325 nm) was used as the laser. The exposure dose of the interference light was 300 mJ/cm². By using the exposure device shown in FIG. 10, the single period of the alignment pattern gradually decreased toward the outer direction.

(Formation of Optically-Anisotropic Layer)

As the liquid crystal composition forming the optically-anisotropic layer, the following composition A-1 was prepared.

| Composition A-1 | |
|---|---|
| Liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |

| Composition A-1 | |
|---|---|
| Leveling agent T-1 | 0.08 parts by mass |
| Methyl ethyl ketone | 936.00 parts by mass |

Liquid Crystal Compound L-1

[Chemical structures showing three liquid crystal compound variants labeled 84%, 14%, and 2%, along with R group definition]

Leveling Agent T-1

[Chemical structure of leveling agent with C$_6$F$_{13}$ groups]

The optically-anisotropic layer was formed by applying multiple layers of the composition A-1 to the alignment film P-1. The application of the multiple layers refers to repetition of the following processes including: preparing a first liquid crystal immobilized layer by applying the first layer-forming composition A-1 to the alignment film, heating the composition A-1, cooling the composition A-1, and irradiating the composition A-1 with ultraviolet light for curing; and preparing a second or subsequent liquid crystal immobilized layer by applying the second or subsequent layer-forming composition A-1 to the formed liquid crystal immobilized layer, heating the composition A-1, cooling the composition A-1, and irradiating the composition A-1 with ultraviolet light for curing as described above. Even in a case where the liquid crystal layer was formed by the application of the multiple layers such that the total thickness of the optically-anisotropic layer was large, the alignment direction of the alignment film was reflected from a lower surface of the optically-anisotropic layer to an upper surface thereof.

Regarding the first liquid crystal layer, the composition A-1 was applied to the alignment film P-1 to form a coating film, the coating film was heated using a hot plate at 80° C., and the coating film was irradiated with ultraviolet light having a wavelength of 365 nm at an irradiation dose of 300 mJ/cm$^2$ using a high-pressure mercury lamp in a nitrogen atmosphere. As a result, the alignment of the liquid crystal compound was immobilized.

Regarding the second or subsequent liquid crystal layer, the composition was applied to the first liquid crystal layer, and the applied composition was heated, cooled, and irradiated with ultraviolet light for curing under the same conditions as described above. As a result, a liquid crystal immobilized layer was prepared. This way, by repeating the application multiple times until the total thickness reached a desired film thickness, an optically-anisotropic layer was obtained. As a result, a liquid crystal diffraction element including the support, the alignment film, and the optically-anisotropic layer was prepared.

In the optically-anisotropic layer, finally, $\Delta n_{940} \times$Thickness (Re(940)) of the liquid crystal was 470 nm, and a periodic liquid crystal alignment pattern having a concentric circular shape as shown in FIG. 8 was provided. Further, it was verified with a polarization microscope that the rotation period of the optical axis of the liquid crystal compound in the optically-anisotropic layer gradually decreased from the center toward the outer side in the one in-plane direction in which the optical axis rotated and that the rotation direction of the optical axis was reversed at the center.

In the liquid crystal alignment pattern of the optically-anisotropic layer, regarding the rotation period (single period) over which the optical axis of the liquid crystal compound rotated by 180°, the rotation period of a center portion was significantly large, the rotation period of a portion at a distance of 1.0 mm from the center was 11.0 μm, the rotation period of a portion at a distance of 2.5 mm from the center was 4.6 μm, and the rotation period of a portion at a distance of 5.0 mm from the center was 2.5 μm. This way, the rotation period gradually decreased from the center toward the outer direction.

<Preparation of Light Collecting Element>

A condenser lens (convex lens) having a focal length of 16 mm was prepared.

<Preparation of λ/4 Plate>

In order to convert linearly polarized light emitted from a light source into circularly polarized light and to be incident into the liquid crystal diffraction element, a λ/4 plate was prepared.

First, a photo-alignment film P-10 was prepared on a glass substrate using the same method as described above.

(Exposure of Alignment Film)

By irradiating the obtained alignment film P-10 with polarized ultraviolet light (100 mJ/cm$^2$, using an extra high pressure mercury lamp), the alignment film P-10 was exposed.

[Preparation of λ/4 Plate]

A composition A-10 was prepared using the same method as that of the above-described composition A-1, except that the amount of methyl ethyl ketone was changed to 193 parts by mass.

The optically-anisotropic layer was formed by applying the composition A-10 to the alignment film P-10.

The applied coating film was heated using a hot plate at 80° C., and the coating film was irradiated with ultraviolet light having a wavelength of 365 nm at an irradiation dose of 500 mJ/cm² using a high-pressure mercury lamp in a nitrogen atmosphere. As a result, the alignment of the liquid crystal compound was immobilized, and an optically-anisotropic layer was prepared. This optically-anisotropic layer was used as a λ/4 plate. In the obtained λ/4 plate, $\Delta n_{940} \times d$ (Re(940)) was 470 nm.

<Assembly of Light Deflection Device>

The λ/4 plate, the micromirror device light deflection element, the light collecting element, and the liquid crystal diffraction element were disposed in this order. As a result, the light deflection device shown in FIG. 14 was prepared. In addition, a drive unit was connected to the micromirror device light deflection element.

The distance between the micromirror device and the condenser lens was 5 mm, and the distance between the micromirror device and the liquid crystal diffraction element was 9 mm. Here, the distance between the condenser lens and the liquid crystal diffraction element was 4 mm.

In addition, as a light source, an infrared laser (wavelength: 940 nm; linearly polarized light) was prepared. The diameter of the laser light was 1 mm.

In addition, the polarization orientation of emitted light of an infrared laser and the in-plane slow axis of the λ/4 plate were disposed to intersect at 45° such that the light was converted into circularly polarized light. In addition, the center of the deflection orientation of the light deflection element and the center of the liquid crystal diffraction element were matched to each other, and the elements were disposed such that the amplification effect of the deflection angle of light was able to be maximized.

Comparative Example 1

A light deflection device was prepared using the same method as that of Example 1, except that the light collecting element was not provided.

[Evaluation]

Regarding the light deflection device according to Example 1, infrared laser light was incident into the micromirror device light deflection element of the light deflection device, the deflection angle of the micromirror device was set to be in a range of −35° to +35°, and the angle of emitted light from the liquid crystal diffraction element was checked.

As a result, it was found that the deflection angle of light emitted from the liquid crystal diffraction element was increased and light was emitted at a deflection angle of ±55°.

In addition, regarding each of the light deflection devices according to Example 1 and Comparative Example 1, a screen was provided at a position 50 cm distant from the liquid crystal diffraction element, and the beam diameter projected to the screen was evaluated to evaluate the straightness of the emitted light.

As a result, in a case where the light deflection device according to Example 1 was compared to that of Comparative Example 1, it was found that the beam spread of the emitted light was able to be suppressed and the straightness of the emitted light was significantly improved.

Example 2

<Preparation of Liquid Crystal Diffraction Element>

As conceptually shown in FIG. 11, a liquid crystal diffraction element including two optically-anisotropic layers of a first optically-anisotropic layer and a second optically-anisotropic layer was prepared.

The first optically-anisotropic layer and the second optically-anisotropic layer are layers where the liquid crystal compound is twisted and aligned, and are tilted optically-anisotropic layers in which, in a cross-sectional SEM image obtained by observing a cross-section of the liquid crystal diffraction element with a SEM, bright and dark lines derived from the twisted alignment of the liquid crystal compound were tilted with respect to the normal line of an interface between the first optically-anisotropic layer and the second optically-anisotropic layer as shown in FIG. 11.

Further, the twisted direction in the twisted alignment of the liquid crystal compound of the first optically-anisotropic layer was different from that of the second optically-anisotropic layer. As a result, the tilt directions of the bright and dark lines derived from the twisted alignment in the cross-sectional SEM images were different from each other.

In the following description, "the bright and dark lines derived from the twisted alignment" will also be simply referred to as "bright and dark lines". In addition, "the normal line of the interface between the first optically-anisotropic layer and the second optically-anisotropic layer" will also be simply referred to as "normal line".

(Formation of First Optically-Anisotropic Layer)

As the liquid crystal composition forming the first optically-anisotropic layer, the following composition A-2 was prepared.

Composition A-2

| | |
|---|---|
| Liquid crystal compound L-1 | 100.00 parts by mass |
| Chiral agent A | 0.13 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 936.00 parts by mass |

Chiral Agent A

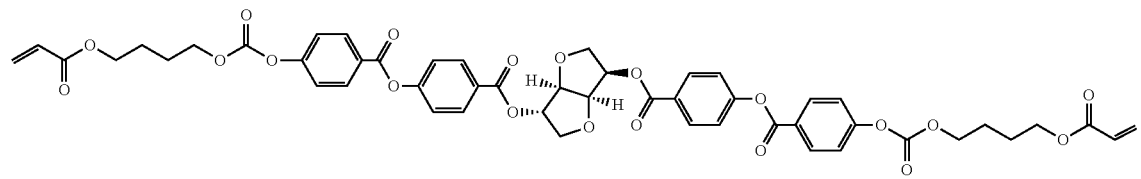 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

A first optically-anisotropic layer was formed on the alignment film P-1 using the same method as that of the optically-anisotropic layer according to Example 1, except that the composition A-2 was used.
(Formation of Second Optically-Anisotropic Layer)

As the liquid crystal composition forming the second optically-anisotropic layer, the following composition A-3 was prepared.

| Composition A-3 | |
|---|---|
| Liquid crystal compound L-1 | 100.00 parts by mass |
| Chiral agent B | 0.22 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 936.00 parts by mass |

Chiral Agent B

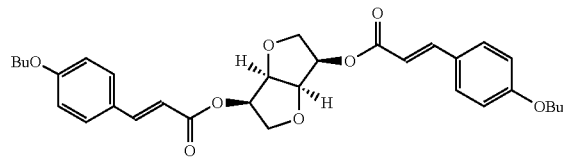

A second optically-anisotropic layer was formed on the first optically-anisotropic layer using the same method as that of the optically-anisotropic layer according to Example 1, except that the composition A-3 was used. As a result, a liquid crystal diffraction element including two optically-anisotropic layers as shown in FIG. 11 was prepared.

In the first optically-anisotropic layer and the second optically-anisotropic layer of the prepared liquid crystal diffraction element, finally, $\Delta n_{940} \times Thickness = Re(940)$ of the liquid crystal was 470 nm, and a periodic liquid crystal alignment pattern having a concentric circular shape as shown in FIG. 8 was provided. Further, it was verified with a polarization microscope that the rotation period of the optical axis of the liquid crystal compound gradually decreased from the center toward the outer side in the one in-plane direction in which the optical axis rotated and that the rotation direction of the optical axis was reversed at the center.

In the liquid crystal alignment pattern of the first optically-anisotropic layer, regarding the rotation period (single period) over which the optical axis of the liquid crystal compound rotated by 180°, the rotation period of a center portion was significantly large, the rotation period of a portion at a distance of 1.0 mm from the center was 11.0 µm, the rotation period of a portion at a distance of 2.5 mm from the center was 4.6 µm, and the rotation period of a portion at a distance of 5.0 mm from the center was 2.5 µm. This way, the rotation period gradually decreased from the center toward the outer direction.

Further, the twisted direction in the liquid crystal compound of the first optically-anisotropic layer was opposite to that of the second optically-anisotropic layer. The twisted angle of the first optically-anisotropic layer in the thickness direction was 80° of the right twisting. On the other hand, the twisted angle in the thickness direction of the second optically-anisotropic layer was 80° of the left twisting.

In the cross-sectional SEM image of the liquid crystal diffraction element, in the first optically-anisotropic layer and the second optically-anisotropic layer, bright and dark lines obliquely tilted with respect to the normal line were observed. In addition, the tilt direction of the bright and dark lines of the first optically-anisotropic layer with respect to the normal line was opposite to that of the second optically-anisotropic layer. As described above, the normal line was the normal line of the interface between the first optically-anisotropic layer and the second optically-anisotropic layer.

In the first optically-anisotropic layer and the second optically-anisotropic layer, the tilt angle of the bright and dark lines with respect to the normal line gradually decreased from the center toward the outer side. Further in the pattern of the bright and dark lines of the first optically-anisotropic layer and the second optically-anisotropic layer, a state where the period decreased from the center toward the outer side was observed.

A light deflection device was prepared using the same method as that of Example 1, except that the liquid crystal diffraction element was changed to the liquid crystal diffraction element including two optically-anisotropic layers of the first optically-anisotropic layer and the second optically-anisotropic layer.

Comparative Example 2

A light deflection device was prepared using the same method as that of Example 2, except that the light collecting element was not provided.
[Evaluation]

Regarding the light deflection device according to Example 2, the angle of emitted light from the liquid crystal diffraction element was checked and evaluated using the same method as that of Example 1.

In the evaluation, likewise, it was verified that the deflection angle from the micromirror device was increased from an incidence angle range of −35° to +35° by the liquid crystal diffraction element, and the light was emitted at a deflection angle of ±55°. In addition, in Example 2, as compared to Example 1, strong emitted light was obtained in a wider angle range.

In addition, regarding each of the light deflection devices according to Example 2 and Comparative Example 2, the straightness of emitted light was evaluated using the same method as that of Example 1.

As a result, in a case where the light deflection device according to Example 2 was compared to that of Comparative Example 2, it was found that the beam spread of the emitted light was able to be suppressed and the straightness of the emitted light was significantly improved.

Example 3

<Preparation of Liquid Crystal Diffraction Element>

As conceptually shown in FIG. 12, a liquid crystal diffraction element three optically-anisotropic layers in which a third optically-anisotropic layer was provided between the first optically-anisotropic layer and the second optically-anisotropic layer was prepared.

The first optically-anisotropic layer and the second optically-anisotropic layer were layers in which the liquid crystal compound was twisted and aligned. Therefore, the first optically-anisotropic layer and the second optically-anisotropic layer were tilted optically-anisotropic layers in which the bright and dark lines in the cross-sectional SEM image were tilted with respect to the normal line as shown in FIG. 12.

Further, the twisted direction in the twisted alignment of the liquid crystal compound of the first optically-anisotropic layer was different from that of the second optically-anisotropic layer. As a result, the tilt directions of the bright and dark lines derived from the twisted alignment in the cross-sectional SEM images were different from each other.

On the other hand, the third optically-anisotropic layer disposed between the first optically-anisotropic layer and the second optically-anisotropic layer was a non-tilted optically-anisotropic layer in which the liquid crystal compound was not twisted and aligned and the bright and dark lines extended in the normal direction. As described above, the normal line was the normal line of the interface between the first optically-anisotropic layer and the second optically-anisotropic layer.

As described above, the twisted direction in the twisted alignment of the liquid crystal compound of the first optically-anisotropic layer was different from that of the second optically-anisotropic layer. As a result, the tilt directions of the bright and dark lines derived from the twisted alignment in the cross-sectional SEM images were different from each other.

(Formation of First Optically-Anisotropic Layer)

As the liquid crystal composition forming the first optically-anisotropic layer, the following composition A-4 was prepared.

| Composition A-4 | |
|---|---|
| Liquid crystal compound L-1 | 100.00 parts by mass |
| Chiral agent A | 0.19 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 936.00 parts by mass |

A first optically-anisotropic layer was formed on the alignment film P-1 using the same method as that of the optically-anisotropic layer according to Example 1, except that the composition A-4 was used.

(Formation of Third Optically-Anisotropic Layer)

The third optically-anisotropic layer was formed on the first optically-anisotropic layer by applying the above-described composition A-1 using the same method as that of the optically-anisotropic layer according to Example 1, except that the film thickness was changed.

(Formation of Second Optically-Anisotropic Layer)

As the liquid crystal composition forming the second optically-anisotropic layer, the following composition A-5 was prepared.

| Composition A-5 | |
|---|---|
| Liquid crystal compound L-1 | 100.00 parts by mass |
| Chiral agent B | 0.32 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 936.00 parts by mass |

A second optically-anisotropic layer was formed on the third optically-anisotropic layer using the same method as that of the optically-anisotropic layer according to Example 1, except that the composition A-5 was used. As a result, a liquid crystal diffraction element including three optically-anisotropic layers as shown in FIG. 12 was prepared.

In the prepared liquid crystal diffraction element, in the first optically-anisotropic layer and the second optically-anisotropic layer, finally, $\Delta n_{940} \times$Thickness=Re(940) of the liquid crystal was 470 nm, and in the third optically-anisotropic layer, $\Delta n_{940} \times$Thickness (Re(940)) of the liquid crystal was 564 nm.

In the first optically-anisotropic layer, the second optically-anisotropic layer, and the third optically-anisotropic layer, a periodic liquid crystal alignment pattern having a concentric circular shape as shown in FIG. 8 was provided. Further, it was verified with a polarization microscope that the rotation period of the optical axis of the liquid crystal compound gradually decreased from the center toward the outer side in the one in-plane direction in which the optical axis rotated and that the rotation direction of the optical axis was reversed at the center.

In the horizontal rotation alignment pattern of the first optically-anisotropic layer, regarding the rotation period (single period) over which the optical axis of the liquid crystal compound rotated by 180°, the rotation period of a center portion was significantly large, the rotation period of a portion at a distance of 1.0 mm from the center was 11.0 µm, the rotation period of a portion at a distance of 2.5 mm from the center was 4.6 µm, and the rotation period of a portion at a distance of 5.0 mm from the center was 2.5 µm. This way, the rotation period gradually decreased from the center toward the outer direction.

Further, the twisted direction in the liquid crystal compound of the first optically-anisotropic layer was opposite to that of the second optically-anisotropic layer. In addition, the twisted angle of the first optically-anisotropic layer in the thickness direction was 130° of the right twisting. The twisted angle of the third optically-anisotropic layer in the thickness direction was 0°. The twisted angle of the second optically-anisotropic layer in the thickness direction was 130° of the left twisting.

In the cross-sectional SEM image of the liquid crystal diffraction element, in the first optically-anisotropic layer and the second optically-anisotropic layer, bright and dark lines obliquely tilted with respect to the normal line were observed. In the third optically-anisotropic layer, bright and dark lines extending along the normal line were observed. The tilt direction of the bright and dark lines of the first optically-anisotropic layer with respect to the normal line was opposite to that of the second optically-anisotropic layer. As described above, the normal line was the normal line of the interface between the first optically-anisotropic layer and the second optically-anisotropic layer.

In the first optically-anisotropic layer and the second optically-anisotropic layer, the tilt angle of the bright and dark lines with respect to the normal line gradually decreased from the center toward the outer side. Further in the pattern of the bright and dark lines of the first optically-anisotropic layer and the second optically-anisotropic layer, a state where the period decreased from the center toward the outer side was observed.

<Preparation of Light Deflection Device>

A light deflection device was prepared using the same method as that of Example 1, except that the liquid crystal diffraction element was changed to the liquid crystal diffraction element including three optically-anisotropic layers of the first optically-anisotropic layer, the second optically-anisotropic layer and the third optically-anisotropic layer.

Comparative Example 3

A light deflection device was prepared using the same method as that of Example 3, except that the light collecting element was not provided.

[Evaluation]

Regarding the light deflection device according to Example 3, the angle of emitted light from the liquid crystal diffraction element was checked and evaluated using the same method as that of Example 1.

In the evaluation, likewise, it was verified that the deflection angle from the micromirror device was increased from an incidence angle range of −35° to +35° by the liquid crystal diffraction element, and the light was emitted at a deflection angle of ±55°. In addition, in Example 3, as compared to Example 1, strong emitted light was obtained in a wider angle range.

In addition, regarding each of the light deflection devices according to Example 3 and Comparative Example 3, the straightness of emitted light was evaluated using the same method as that of Example 1.

As a result, in a case where the light deflection device according to Example 3 was compared to that of Comparative Example 3, it was found that the beam spread of the emitted light was able to be suppressed and the straightness of the emitted light was significantly improved.

Example 4

<Preparation of Light Collecting Element>

A light collecting element including a liquid crystal diffraction element was prepared by changing the exposure of the alignment film to change the period of the alignment pattern during the preparation of the liquid crystal diffraction element according to Example 2.

In the liquid crystal alignment pattern of the first optically-anisotropic layer, regarding the rotation period (single period) over which the optical axis of the liquid crystal compound rotated by 180°, the rotation period of a center portion was significantly large, the rotation period of a portion at a distance of 1.0 mm from the center was 15.1 μm, the rotation period of a portion at a distance of 2 mm from the center was 7.6 μm, and the rotation period of a portion at a distance of 4 mm from the center was 3.9 μm. This way, the rotation period gradually decreased from the center toward the outer direction.

In addition, the focal length of the prepared light collecting element including the liquid crystal diffraction element was 16 mm.

<Assembly of Light Deflection Device>

A light deflection device was prepared using the same method as that of Example 2, except that the light collecting element was changed to the light collecting element prepared as described above and was disposed in a state where the in-plane slow axis of the λ/4 plate was rotated by 90° such that light emitted from the λ/4 plate was circularly polarized light in a direction opposite to that of Example 2.

Comparative Example 4

A light deflection device was prepared using the same method as that of Example 4, except that the light collecting element was not provided.

[Evaluation]

Regarding the light deflection device according to Example 4, the angle of emitted light from the liquid crystal diffraction element was checked and evaluated using the same method as that of Example 1.

In the evaluation, likewise, it was verified that the deflection angle from the micromirror device was increased from an incidence angle range of −35° to +35° by the liquid crystal diffraction element, and the light was emitted at a deflection angle of ±55°.

In addition, regarding the light deflection device according to Example 4, the straightness of emitted light was evaluated using the same method as that of Example 1.

As a result, in a case where the light deflection device according to Example 4 was compared to that of Comparative Example 4, it was found that the beam spread of the emitted light was able to be suppressed and the straightness of the emitted light was significantly improved.

As described above, it was verified that the present invention can exhibit an effect of obtaining a light deflection device having a simple structure suitable for reducing the size and weight where a deflection angle can be increased.

The present invention is suitably applicable to various optical devices such as a distance-measuring sensor.

EXPLANATION OF REFERENCES

12: support
13: alignment film
14, 14A: optically-anisotropic layer
20: liquid crystal compound
22: optical axis
50, 80: exposure device
52, 82: laser
54, 84: light source
56: beam splitter
58A, 58B, 90A, 90B: mirror
60A, 60B, 96, 111: λ/4 plate
70: laser light
72A, 72B: beam
86, 94: polarization beam splitter
92: lens
100: light deflection device
101: light deflection element
101A: MEMS light deflection element
102: interval
103: incident surface
110: optical device
112: light source
114: light-receiving element
120: angle increasing optical element
120a to 120e: divided regions
121, 121A, 220, 224: liquid crystal diffraction element
131: condenser lens
132: liquid crystal optical phase modulation element
141: drive unit
151: incidence light
161: emission surface
171: arrow
201: first transparent substrate
203: second transparent substrate
207: director
209: alignment layer
211: composite electrode
213: common electrode
215: first optically-anisotropic layer
216: second optically-anisotropic layer
219: third optically-anisotropic layer
501: nematic liquid crystal layer
L: light L₁: incidence light
L₂: emitted light
$P_O$: linearly polarized light
$P_R$: right circularly polarized light
$P_L$: left circularly polarized light
M: laser light
MP: P polarized light
MS: S polarized light
β: intersecting angle
p: rotation period
A, $A_1$, $A_2$, $A_3$: axis
θ: deflection angle
θmax: maximum deflection angle
θmaxout: emission angle

What is claimed is:

1. A light deflection device comprising:
a light deflection element that deflects incident light to be emitted;
a driving unit that drives the light deflection element;
an angle increasing optical element that is disposed downstream of the light deflection element in a light traveling direction and increases an angle range of a deflection angle of light emitted from the light deflection element, the angle increasing optical element consisting of a diffraction element having different periodic structure pitches in a plane; and
a light collecting element that is disposed downstream of the light deflection element in the light traveling direction;
wherein the angle increasing optical element is a liquid crystal diffraction element, and
the liquid crystal diffraction element includes an optically-anisotropic layer that is formed using a composition including a liquid crystal compound and has a liquid crystal alignment pattern in which a direction of an optical axis derived from the liquid crystal compound changes while continuously rotating in at least one in-plane direction.

2. The light deflection device according to claim 1,
wherein an optical path length between centers of the angle increasing optical element and the light collecting element is shorter than a focal length of the light collecting element.

3. The light deflection device according to claim 1,
wherein the diffraction element in the angle increasing optical element is a diffraction element in which the periodic structure pitch gradually changes from a center of the deflection angle of the light deflection element toward an outer side.

4. An optical device comprising:
the light deflection device according to claim 1;
a light source that emits light to the light deflection element of the light deflection device; and
a light-receiving element.

5. The light deflection device according to claim 2,
wherein the diffraction element in the angle increasing optical element is a diffraction element in which the periodic structure pitch gradually changes from a center of the deflection angle of the light deflection element toward an outer side.

6. The light deflection device according to claim 1,
wherein the liquid crystal alignment pattern of the optically-anisotropic layer is a concentric circular pattern having a concentric circular shape where the one in-plane direction in which the direction of the optical axis derived from the liquid crystal compound changes while continuously rotating moves from an inner side toward an outer side.

7. The light deflection device according to claim 1,
wherein the optically-anisotropic layer includes a liquid crystal compound that is twisted and aligned along a helical axis extending in a thickness direction.

8. The light deflection device according to claim 7,
wherein the liquid crystal diffraction element includes two optically-anisotropic layers having opposite twisted directions in which the liquid crystal compound is twisted and aligned along the helical axis extending in the thickness direction.

9. The light deflection device according to claim 8,
wherein the optically-anisotropic layer in which the liquid crystal compound is not twisted and aligned is provided between the two optically-anisotropic layers.

10. The light deflection device according to claim 1,
wherein the light collecting element is a condenser lens element.

11. The light deflection device according to claim 1,
wherein the light collecting element is a diffraction element having different periodic structure pitches in a plane.

12. The light deflection device according to claim 11,
wherein the light collecting element is a liquid crystal diffraction element.

13. The light deflection device according to claim 12,
wherein the light collecting element is a liquid crystal diffraction element including an optically-anisotropic layer that is formed using a composition including a liquid crystal compound and has a liquid crystal alignment pattern in which a direction of an optical axis derived from the liquid crystal compound changes while continuously rotating in at least one in-plane direction.

14. The light deflection device according to claim 13,
wherein the liquid crystal alignment pattern of the optically-anisotropic layer in the light collecting element is a concentric circular pattern having a concentric circular shape where the one in-plane direction in which the direction of the optical axis derived from the liquid crystal compound changes while continuously rotating moves from an inner side toward an outer side.

15. The light deflection device according to claim 13,
wherein the optically-anisotropic layer in the light collecting element includes a liquid crystal compound that is twisted and aligned along a helical axis extending in a thickness direction.

16. The light deflection device according to claim 1,
wherein the light deflection element is an optical phase modulation element.

17. The light deflection device according to claim 1,
wherein the light deflection element is a liquid crystal optical phase modulation element.

18. The light deflection device according to claim 1,
wherein the light deflection element is a MEMS light deflection element.

19. A light deflection device comprising:
a light deflection element that deflects incident light to be emitted;
a driving unit that drives the light deflection element;
an angle increasing optical element that is disposed downstream of the light deflection element in a light traveling direction and increases an angle range of a deflection angle of light emitted from the light deflection element, the angle increasing optical element consisting of a diffraction element having different periodic structure pitches in a plane; and a light collecting element that is disposed downstream of the light deflection element in the light traveling direction;

wherein the light collecting element is a diffraction element having different periodic structure pitches in a plane.

* * * * *